US010621684B2

United States Patent
Ong et al.

(10) Patent No.: US 10,621,684 B2
(45) Date of Patent: *Apr. 14, 2020

(54) ALLOWING GUEST OF HOSPITALITY ESTABLISHMENT TO UTILIZE MULTIPLE GUEST DEVICES TO ACCESS NETWORK SERVICE

(71) Applicant: Guest Tek Interactive Entertainment Ltd., Calgary (CA)

(72) Inventors: David T. Ong, Calgary (CA); Joshua M. Wookey, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,265

(22) Filed: Mar. 7, 2019

(65) Prior Publication Data

US 2019/0206001 A1 Jul. 4, 2019

Related U.S. Application Data

(63) Continuation of application No. 15/964,337, filed on Apr. 27, 2018, now Pat. No. 10,269,083, which is a
(Continued)

(30) Foreign Application Priority Data

Sep. 6, 2012 (CA) ...................................... 2788573

(51) Int. Cl.
*G06Q 50/12* (2012.01)
*H04L 29/06* (2006.01)
(Continued)

(52) U.S. Cl.
CPC ............. *G06Q 50/12* (2013.01); *H04L 63/08* (2013.01); *H04L 63/107* (2013.01);
(Continued)

(58) Field of Classification Search
CPC ........ G06Q 50/12; G06Q 30/04; H04L 63/08; H04L 63/107; H04L 63/108; H04W 12/08
See application file for complete search history.

(56) References Cited

U.S. PATENT DOCUMENTS 8,127,008 B2 * 2/2012 Manning ................. H04L 29/06
709/219
8,676,273 B1 * 3/2014 Fujisaki .............. H04M 1/6505
455/567

(Continued)

FOREIGN PATENT DOCUMENTS

| EP | 2214383 A1 | 8/2010 |
|---|---|---|
| WO | 2001031861 A1 | 5/2001 |
| WO | 2011049784 A2 | 4/2011 |

OTHER PUBLICATIONS

Davis, David. "How to determine what device is on what port on your Cisco switch," Tech Republic, Nov. 8, 2007.
(Continued)

*Primary Examiner* — J. Brant Murphy
(74) *Attorney, Agent, or Firm* — ATMAC Patent Services Ltd.; Andrew T. MacMillan

(57) ABSTRACT

Network traffic, including a device identifier, is received from a guest device on a computer network of a hospitality establishment. The device identifier of the guest device is used to determine that the guest device is not already authorized to access the network service at a time the network traffic is received, the guest device hence considered an unrecognized guest device. A user profile server is queried to determine a user identifier that is associated with the device identifier of the guest device. A login database is queried to find an unexpired login record of an authorized guest device associated with the user identifier, the unexpired login record granting the authorized guest device access to the network service for an allowed access duration.

(Continued)

The unrecognized guest device is automatically granted access to the network service for a remaining portion of the allowed access duration of the unexpired login record.

20 Claims, 10 Drawing Sheets

Related U.S. Application Data continuation of application No. 15/431,885, filed on Feb. 14, 2017, now Pat. No. 9,990,681, which is a continuation of application No. 13/611,069, filed on Sep. 12, 2012, now Pat. No. 9,608,998.

(51) Int. Cl.
*H04W 12/08* (2009.01)
*G06Q 30/04* (2012.01)

(52) U.S. Cl.
CPC ........... *H04L 63/108* (2013.01); *H04W 12/08* (2013.01); *G06Q 30/04* (2013.01)

(56) References Cited

U.S. PATENT DOCUMENTS

| | | | |
|---|---|---|---|
| 8,719,108 B1* | 5/2014 | Dugaw | G06Q 30/0633 705/26.1 |
| 8,813,211 B2 | 8/2014 | Baker et al. | |
| 9,130,934 B2 | 9/2015 | Warrick et al. | |
| 9,288,692 B2 | 3/2016 | Baker et al. | |
| 9,526,063 B2 | 12/2016 | Baker et al. | |
| 9,608,998 B2 | 3/2017 | Ong et al. | |
| 9,742,691 B2 | 8/2017 | Baker et al. | |
| 9,990,681 B2 | 6/2018 | Ong et al. | |
| 10,044,724 B2 | 8/2018 | Warrick et al. | |
| 10,069,754 B2 | 9/2018 | Baker et al. | |
| 10,269,083 B2 | 4/2019 | Ong et al. | |
| 2002/0009078 A1* | 1/2002 | Wilson | H04L 12/2856 370/389 |
| 2002/0099665 A1* | 7/2002 | Burger | G06F 21/32 705/67 |
| 2005/0091539 A1* | 4/2005 | Wang | G06F 21/31 726/4 |
| 2005/0177506 A1* | 8/2005 | Rissanen | G06Q 20/102 705/40 |
| 2006/0031436 A1* | 2/2006 | Sakata | H04L 12/14 709/221 |
| 2006/0031515 A1* | 2/2006 | Van Gassel | H04W 88/04 709/227 |
| 2006/0195856 A1* | 8/2006 | Solomon | G06Q 30/00 725/5 |
| 2007/0038570 A1* | 2/2007 | Halbritter | G06Q 10/10 705/50 |
| 2008/0085698 A1* | 4/2008 | Gamm | H04M 15/00 455/414.1 |
| 2008/0134312 A1* | 6/2008 | Ache | G06F 21/10 726/9 |
| 2009/0052459 A1* | 2/2009 | West | H04L 12/2859 370/400 |
| 2009/0138975 A1* | 5/2009 | Richardson | G06F 21/10 726/32 |
| 2009/0313053 A1* | 12/2009 | Gengarella | G06Q 10/02 705/5 |
| 2010/0030590 A1* | 2/2010 | Sodaro | E04H 3/02 705/5 |
| 2010/0189129 A1* | 7/2010 | Hinosugi | H04L 47/10 370/468 |
| 2010/0250290 A1* | 9/2010 | Lefkowitz | G06Q 10/02 705/5 |
| 2011/0030037 A1* | 2/2011 | Olshansky | H04L 12/4641 726/4 |
| 2012/0096132 A1* | 4/2012 | Lim | H04L 12/66 709/220 |
| 2012/0185586 A1* | 7/2012 | Olshansky | H04L 41/0893 709/224 |
| 2013/0055324 A1* | 2/2013 | Ostlund | H04N 21/2543 725/83 |
| 2013/0074106 A1* | 3/2013 | Hayashi | H04N 21/2143 725/1 |
| 2014/0244434 A1 | 8/2014 | Dugaw et al. | |

OTHER PUBLICATIONS

Guest TEK Interactive Entertainment Ltd., "OneView Internet Version 6.2", Release Notes, Sep. 15, 2011.

* cited by examiner

Exemplary login database

| Device ID | Stored guest ID | Guest area | HSIA expiry | Max. Bandwidth | Allowed # of guest devices |
|---|---|---|---|---|---|
| MAC-1 | 122-32-1001 | Room 103 | 2012/08/13 16:32 | 256 kbps | 3 |
| MAC-2 | 122-32-1003 | Room 105 | 2012/08/16 17:11 | 256 kbps | 3 |
| MAC-3 | 122-32-1003 | Room 105 | 2012/08/16 17:11 | 256 kbps | 3 |
| MAC-4 | 122-32-1003 | Room 105 | 2012/08/16 17:11 | 256 kbps | 3 |
| MAC-5 | 122-32-2345 | Room 117 | 2012/08/17 00:01 | 256 kbps | 3 |
| MAC-6 | 122-32-2000 | Room 719 | 2012/08/17 17:44 | 1 Mbps | 5 |
| MAC-7 | 122-32-1020 | Room 701 | 2012/08/17 16:01 | 1 Mbps | 5 |
| ⋮ | ⋮ | ⋮ | ⋮ | ⋮ | ⋮ |

Access-node mapping table

| Network device | Port | Destination |
|---|---|---|
| Switch A | 1 | WAN |
| | 2 | Meeting room 1 |
| | 3 | Switch B |
| | 4 | Switch C |
| | 5 | Switch D |
| | 6 | Meeting room 2 |
| Switch B | 1 | Switch A |
| | 2 | Guest room 101 |
| | 3 | Guest room 103 |
| | 4 | Guest room 105 |
| | 5 | Guest room 107 |
| Switch C | 1 | Switch A |
| | 2 | Guest room 109 |
| | 3 | Guest room 111 |
| | 4 | Guest room 113 |
| | 5 | Guest room 115 |
| Switch D | 1 | Switch A |
| | 2 | Guest room 125 |
| | 3 | Guest room 127 |
| | 4 | Guest room 129 |
| | 5 | Guest room 131 |
| | 6 | Switch E |
| Switch E | 1 | Switch D |
| | 2 | Guest room 117 |
| | 3 | Guest room 119 |
| | 4 | Guest room 121 |
| | 5 | Guest room 123 |
| ⋮ | ⋮ | ⋮ |

Modify user profile settings for: Josh Wookey

Guest devices associated with this account:

| User device | MAC address (Device ID) | |
|---|---|---|
| Mobile phone | 00-E4-A1-32-C3-39 | (Remove) |
| Corporate laptop | 20-B0-D0-86-BB-F9 | (Remove) |
| Tablet computer | 71-FE-D0-26-A1-03 | (Remove) |

(Add new device)

Loyalty program membership numbers associated with this account:

| Hospitality establishment (Site ID) | Loyalty program # (User ID) | User type (Access entitlement) | |
|---|---|---|---|
| Galactic Hotel (4) | 122-32-2345 | Regular | (Remove) |
| Centennial Airlines (35) | ABF334401 | Regular | (Remove) |
| Beaches Resort (135) | 5E3DA7 | VIP | (Remove) |
| Waterfront park (139) | 4391 | Regular | (Remove) |
| Terminal bus lines (144) | 2010-01-01-39 | Regular (upgrade) | (Remove) |

(Add new location)

(Save)    (Cancel)

FIG. 7

Exemplary guest database of hospitality establishment (e.g., Property Management System database)

| Guest area (Room #) | Information of currently registered guest | | | |
|---|---|---|---|---|
| | Last name | First name | Check-in time | Guest identifier (e.g., loyalty program member identifier) |
| 101 | Warrick | Peter | 2012/08/17 00:01 | 122-32-1001 |
| 103 | Kizer | Alex | 2012/08/12 16:32 | 122-32-1002 |
| 105 | Ong | David | 2012/08/15 17:11 | 122-32-1005 |
| 107 | MacMillan | Andrew | 2012/08/17 17:11 | 122-32-2000 |
| 109 | - | - | - | - |
| 111 | Villanueva | Jose | 2012/08/17 17:44 | 122-32-2101 |
| 115 | Baker | Alexandra | 2012/08/17 00:01 | 122-32-2121 |
| 117 | Wookey | Josh | 2012/08/16 00:01 | 122-32-2345 |
| ⋮ | ⋮ | ⋮ | ⋮ | ⋮ |

FIG. 9

ALLOWING GUEST OF HOSPITALITY ESTABLISHMENT TO UTILIZE MULTIPLE GUEST DEVICES TO ACCESS NETWORK SERVICE

CROSS-REFERENCE TO RELATED APPLICATIONS

This application is a continuation of U.S. patent application Ser. No. 15/964,337 filed Apr. 27, 2018, which is a continuation of U.S. patent application Ser. No. 15/431,885 filed Feb. 14, 2017, which is a continuation of U.S. patent application Ser. No. 13/611,069 filed Sep. 12, 2012, which claims the benefit of Canadian Patent Application No. 2,788,573 filed Sep. 6, 2012. Each of these applications are incorporated herein by reference.

BACKGROUND OF THE INVENTION

(1) Field of the Invention

The invention pertains generally to controlling access to a network service provided over a computer network of a hospitality establishment. More specifically, the invention relates to allowing a guest of the hospitality establishment to access the network service from multiple guest devices.

(2) Description of the Related Art

Hospitality establishments such as hotels and resorts often provide high speed Internet access (HSIA) to guests. A guest typically connects a guest device to the hotel's computer network, either through a physical cable such as Ethernet or a wireless connection such as Wi-Fi™, and opens a web browser to access a website on the Internet. Instead of allowing guest devices immediate access to the Internet, a control system at the hotel acts as a captive portal and requires the guest to first log in at a predetermined login portal. To this end, a gateway or firewall controlling access between the local area network (LAN) of the hotel and the Internet includes a default rule that causes unauthorized guest devices to display the login portal in the web browser.

At the login portal the guest signs up for Internet access. When the guest is an individual staying at the hotel, the guest enters their room number and other personal details, selects a desired bandwidth level and other options such as access duration etc., provides payment information, and performs other actions such as agreeing to terms and conditions. The control system only authorizes the guest device to access the Internet after the guest has successfully completed the login process at the login portal. By the control system adding to the firewall a device-specific rule that allows data to flow between the Internet and the unique media access control (MAC) address of the authorized guest device, only guest devices from which guests of the hotel have properly logged in at the login portal are provided HSIA.

Guests often bring more than one personal electronic device with them when they travel. For example, a guest may bring a laptop computer, a mobile phone, and a tablet computer; and may expect each to receive Internet access while at the hospitality establishment. With many simple hotel Internet control systems, the guest will need to complete the full sign-up procedure at the login portal on each of their personal devices to gain Internet access. This is both troublesome to the guest and may result in billing the same guest multiple times, e.g., charging separately for each of their devices.

More sophisticated hotel Internet control systems attempt to solve the multi-device problem for individual guests by providing a button labeled "Already purchased?" on the homepage of the hotel's login portal. When a guest clicks this button the login portal brings up an overlay screen allowing the guest to enter their last name and room number to confirm they have already purchased an HSIA package. The login portal searches the billing records to determine whether the last name and room number entered by the guest at the login portal match the billing records for an already purchased Internet package. When yes, the new guest device is provided Internet access without rebilling or requiring further payment information from the guest at the login portal. In some deployments, the guest needs to have already purchased a higher-priced Internet package at the hotel to enable this multi-device capability. For example, a "Premium" HSIA package may be up to four times faster than a "Standard" package and may include support for up to three guest devices.

However, some guests are poor typists and may misspell their last name, and other guests may deliberately enter fake names due to privacy concerns when signing up for Internet access over a hotel's wireless network, for example. If the guest spells their last name differently when first purchasing HSIA access than when subsequently trying to log in an additional device, the inconsistent name spellings will prevent the guest from logging in the additional device for free. In another example, two individuals with different last names may be sharing a hotel room. In this case, one guest may be blocked from logging in an additional device for free if they misspell the other guest's last name as it was entered during the initial login process. Although problems involving an additional device being blocked from free login due to name misspellings are often solvable by the guest retrying with the correct spelling, there are certain situations where the assistance of hotel technical support staff is required. For example, the guest may simply not remember what name (or spelling) was utilized during the initial purchase.

Furthermore, some user devices brought to hotels are unable to be logged in at a web-based login portal because the devices either do not include web browsing technology or do not permit the guest to access the login portal. Examples of guest devices that do not include web browsing technology include standalone teleconferencing webcam appliances, routers, Internet Protocol (IP) telephones, and other IP-enabled devices that lack a user interface capable of displaying the login portal or allowing the guest to enter the required login information. Examples of guest devices that do not permit the guest to access the login portal include locked-down corporate and military laptops and equipment configured to only connect with a designated destination such as a fixed server address accessed via a company or military virtual private network (VPN). In order for a guest to connect one of these devices to the Internet as a free additional device added on to their already purchased account, they will need to contact hotel technical support staff to have the device manually cleared through the firewall.

Requiring guests to contact support staff both increases the support costs of the hospitality establishment's HSIA service and negatively impacts the guest experience. It would be desirable if the Internet access control system did not solely rely on verifying information entered by the guest at a web-based login portal in order to determine that an unrecognized guest device is actually an additional device of a guest who has already purchased an Internet package.

BRIEF SUMMARY OF THE INVENTION

According to an exemplary embodiment of the invention, during a login by a new guest at the login portal, a guest identifier such as the loyalty number of the current guest registered for the room identified during the login process is requested by the login portal from hotel's property management system (PMS). The retrieved guest identifier is stored in the guest's primary login record when it is created, and reflects the first time the guest has logged in to the hotel's Internet system, for example, the guest who made the initial purchase. Upon the same guest thereafter utilizing a different guest device at the hotel, the system detects the room associated with the new device to be the same room as the primary login and compares the stored guest identifier of the primary login with a current guest identifier representing the guest currently registered for the room as retrieved from the hotel's PMS. When there is a match, the system knows that the room is still in use by the same guest and automatically treats the new guest device as an additional device, namely, the guest device is automatically given Internet access and the user is optionally presented with an additional device welcome screen rather than the screens for the regular sign-up procedure. Alternatively, when there is not a match, the system knows that the room is now being utilized by a new guest and therefore presents the regular sign-up procedure to the new guest. In other words, when a subsequent guest later checks in to the room and tries to connect to the Internet from their personal device, the login portal detects the room number and queries the PMS for the current guest identifier of the guest currently registered for that room. Because the current guest identifier of the current guest as specified in the PMS no longer matches that stored with the primary login record (from the previous guest), the login request is treated as a primary login request and the new guest must perform the full sign-up procedure in order to login.

An advantage of the above embodiment is that the system does not solely rely on verifying information retrieved from an unrecognized guest device at a web-based login portal. Instead, a stored guest identifier retrieved from the PMS at the time of the original purchase is compared with a current guest identifier retrieved from the PMS at the time the unrecognized guest device is detected on the network. When the guest of the room is the same, the stored guest identifier will match the current guest identifier; when the guests are not the same, the stored guest identifier will not match the current guest identifier. This helps to prevent problems caused by the guest entering inconsistent information between the initial sign-on process and when later adding an additional device. Furthermore, although the process of this embodiment supports the guest entering their last name and room number at the login portal as a way to verify the guest and identify the guest room associated with the unrecognized guest device, this is not a requirement and the process can also be transparent to the guest device without requiring the guest device to access the hotel's login portal before gaining Internet access. A guest device not capable of logging in at the login portal can therefore be automatically logged in as an additional device of an existing login record.

According to an exemplary embodiment of the invention a method of controlling access to a network service provided over a computer network of a hospitality establishment is disclosed. The method includes receiving network traffic from a guest device on the computer network, wherein the guest device is operated by a guest of the hospitality establishment and is not already authorized to access the network service. The method further includes identifying, according to the network traffic, a guest area of the hospitality establishment with which the guest device is associated, and querying a login database to find an unexpired login for the guest area. The unexpired login indicates that another guest device associated with the guest area has previously been granted access to the network service and that an allowed access duration for the other guest device has not yet expired. The unexpired login specifies a stored guest identifier corresponding to information retrieved from a property management system of the hospitality establishment regarding a guest of the guest area at a time when the unexpired login was created. The method includes comparing the stored guest identifier of the unexpired login with a current guest identifier of the guest area, wherein the current guest identifier corresponds to information retrieved from the property management system regarding a current guest of the guest area. The method further includes automatically allowing the guest device to access the network service for a remaining portion of the allowed access duration of the unexpired login when the stored guest identifier matches the current guest identifier.

According to another exemplary embodiment of the invention there is disclosed a tangible computer-readable medium comprising computer executable instructions that when executed by a computer cause the computer to perform the above method.

According to another exemplary embodiment of the invention there is disclosed an apparatus for controlling access to a network service provided over a computer network of a hospitality establishment. The apparatus includes a network interface coupled to the computer network, a login database storing therein a plurality of logins of guest devices associated with different guest areas that are already authorized to access the network service of the hospitality establishment, and one or more processors coupled to the network interface and the database. The one or more processors are operable to receive, via the network interface, network traffic from a guest device on the computer network, wherein the guest device is operated by a guest of the hospitality establishment and is not already authorized to access the network service. The one or more processors are further operable to identify, according to the network traffic, a guest area of the hospitality establishment with which the guest device is associated, and query the login database to find an unexpired login for the guest area. The unexpired login indicates that another guest device associated with the guest area has previously been granted access to the network service and that an allowed access duration for the other guest device has not yet expired. The unexpired login specifies a stored guest identifier corresponding to information retrieved from a property management system of the hospitality establishment regarding a guest of the guest area at a time when the unexpired login was created. The one or more processors are further operable to compare the stored guest identifier of the unexpired login with a current guest identifier of the guest area; wherein the current guest identifier corresponds to information retrieved from the property management system regarding a current guest of the guest area. The one or more processors are further operable to automatically reconfigure one or more network components of the computer network to thereby allow the guest device to access the network service for a remaining portion of the allowed access duration of the unexpired login when the stored guest identifier matches the current guest identifier.

According to another exemplary embodiment of the invention there is disclosed an apparatus for controlling access to a network service provided over a computer network of a hospitality establishment. The apparatus includes means for receiving network traffic from a guest device on the computer network, wherein the guest device is operated by a guest of the hospitality establishment and is not already authorized to access the network service. The apparatus further includes means for identifying, according to the network traffic, a guest area of the hospitality establishment with which the guest device is associated, and means for determining whether an unexpired login exists for the guest area. The unexpired login indicates that another guest device associated with the guest area has previously been granted access to the network service and that an allowed access duration for the other guest device has not yet expired. The unexpired login specifies a stored guest identifier corresponding to information retrieved from a property management system of the hospitality establishment regarding a guest of the guest area at a time when the unexpired login was created. The apparatus further includes means for comparing the stored guest identifier of the unexpired login with a current guest identifier of the guest area when the unexpired login exists for the guest area, wherein the current guest identifier corresponds to information retrieved from the property management system regarding a current guest of the guest area. The apparatus further includes means for automatically allowing the guest device to access the network service for a remaining portion of the allowed access duration of the unexpired login when the stored guest identifier matches the current guest identifier.

According to another exemplary embodiment of the invention there is disclosed a method of controlling access to a network service provided over a computer network of a hospitality establishment. The method includes receiving network traffic from a guest device on the computer network, wherein the guest device is operated by a guest of the hospitality establishment and is not already authorized to access the network service; and identifying, according to the network traffic, a guest area of the hospitality establishment with which the guest device is associated, wherein the guest area is one of a plurality of physically separate areas provided by the hospitality establishment. The method further includes querying a login database to find an unexpired login for the guest area, the unexpired login indicating that another guest device associated with the guest area has previously been granted access to the network service and that an allowed access duration for the other guest device has not yet expired; and counting a total number of guest devices that are associated with the unexpired login. The method further includes automatically allowing the guest device to access the network service for a remaining portion of the allowed access duration of the unexpired login when the total number of guest devices has not already reached a predetermined allowable number of devices; and when the total number of guest devices has already reached the predetermined allowable number of devices, causing the guest device to display a billing screen giving an option to increase the predetermined allowable number of additional devices for a monetary charge.

According to another exemplary embodiment of the invention there is disclosed a non-transitory tangible computer-readable medium comprising computer executable instructions that when executed by a computer cause the computer to perform a method of controlling access to a network service provided over a computer network of a hospitality establishment. The method includes receiving network traffic from a guest device on the computer network, wherein the guest device is operated by a guest of the hospitality establishment and is not already authorized to access the network service; and identifying, according to the network traffic, a guest area of the hospitality establishment with which the guest device is associated, wherein the guest area is one of a plurality of physically separate areas provided by the hospitality establishment. The method further includes querying a login database to find an unexpired login for the guest area, the unexpired login indicating that another guest device associated with the guest area has previously been granted access to the network service and that an allowed access duration for the other guest device has not yet expired; and counting a total number of guest devices that are associated with the unexpired login. The method further includes automatically allowing the guest device to access the network service for a remaining portion of the allowed access duration of the unexpired login when the total number of guest devices has not already reached a predetermined allowable number of devices; and when the total number of guest devices has already reached the predetermined allowable number of devices, causing the guest device to display a billing screen giving an option to increase the predetermined allowable number of additional devices for a monetary charge.

According to another exemplary embodiment of the invention there is disclosed an apparatus for controlling access to a network service provided over a computer network of a hospitality establishment. The apparatus includes a network interface coupled to the computer network; a storage device storing a login database of a plurality of logins of guest devices that are already authorized to access the network service; and one or more processors coupled to the network interface and the storage device. The one or more processors are operable to receive, via the network interface, network traffic from a guest device on the computer network, wherein the guest device is operated by a guest of the hospitality establishment and is not already authorized to access the network service; and identify, according to the network traffic, a guest area of the hospitality establishment with which the guest device is associated, wherein the guest area is one of a plurality of physically separate areas provided by the hospitality establishment. The one or more processors are further operable to query the login database to find an unexpired login for the guest area, the unexpired login indicating that another guest device associated with the guest area has previously been granted access to the network service and that an allowed access duration for the other guest device has not yet expired; and count a total number of guest devices that are associated with the unexpired login. The one or more processors are further operable to automatically reconfigure one or more network components of the computer network to thereby allow the guest device to access the network service for a remaining portion of the allowed access duration of the unexpired login when the total number of guest devices has not already reached a predetermined allowable number of devices; and when the total number of guest devices has already reached the predetermined allowable number of devices, cause the guest device to display a billing screen giving an option to increase the predetermined allowable number of additional devices for a monetary charge.

According to an exemplary embodiment of the invention there is disclosed an apparatus for controlling access to a network service provided over a computer network of a hospitality establishment. The apparatus includes a network interface coupled to the computer network, a storage device, and one or more processors coupled to the network interface and the storage device. By the one or more processors executing software instructions loaded from the storage device, the one or more processors are configured to receive first network traffic from a first guest device on the computer network and determine a guest area of the hospitality establishment that is associated with the first guest device. The guest area is one of a plurality of physically separate areas provided by the hospitality establishment, and assignment of the guest area for guest usage is managed by a property management system (PMS) of the hospitality establishment. The one or more processors are further configured to query a login database to determine that there is no unexpired login record for the guest area at a time the first network traffic is received, require the first guest device to successfully complete a login process at a login portal before granting the first guest device access to the network service, and query the property management system (PMS) of the hospitality establishment to retrieve a first guest identifier representing a guest registered for the guest area at a time the login process is successfully completed by the first guest device. The one or more processors are further configured to store a login record for the guest area in the login database and including the first guest identifier in the login record in response to the first guest device successfully completing the login process, receive second network traffic from a second guest device on the computer network, and determine that the second guest device is associated with the guest area. The one or more processors are further configured to query the login database to determine that an allowed access time of the login record for the guest area has not yet expired at a time the second network traffic is received, query the property management system (PMS) to retrieve a second guest identifier representing a guest registered for the guest area at the time the second network traffic is received, and compare the second guest identifier with the first guest identifier. In response to the second guest identifier not matching the first guest identifier, the one or more processors require the second guest device to successfully complete the login process at the login portal before granting the second guest device access to the network service. In response to the second guest identifier matching the first guest identifier, the one or more processors automatically grant the second guest device access to the network service for a remaining portion of the allowed access duration of the login record without requiring the second guest device to successfully complete the login process at the login portal.

According to an exemplary embodiment of the invention there is disclosed a method of controlling access to a network service provided over a computer network of a hospitality establishment. The method includes receiving first network traffic from a first guest device on the computer network and determining a guest area of the hospitality establishment that is associated with the first guest device. The guest area is one of a plurality of physically separate areas provided by the hospitality establishment, and assignment of the guest area for guest usage is managed by a property management system (PMS) of the hospitality establishment. The method further includes querying a login database to determine that there is no unexpired login record for the guest area at a time the first network traffic is received; requiring the first guest device to successfully complete a login process at a login portal before granting the first guest device access to the network service, querying the property management system (PMS) of the hospitality establishment to retrieve a first guest identifier representing a guest registered for the guest area at a time the login process is successfully completed by the first guest device, and storing a login record for the guest area in the login database and including the first guest identifier in the login record in response to the first guest device successfully completing the login process. The method further includes receiving second network traffic from a second guest device on the computer network, determining that the second guest device is associated with the guest area, querying the login database to determine that an allowed access time of the login record for the guest area has not yet expired at a time the second network traffic is received. The method further includes querying the property management system (PMS) to retrieve a second guest identifier representing a guest registered for the guest area at the time the second network traffic is received and comparing the second guest identifier with the first guest identifier. In response to the second guest identifier not matching the first guest identifier, the method further includes requiring the second guest device to successfully complete the login process at the login portal before granting the second guest device access to the network service. In response to the second guest identifier matching the first guest identifier, the method further includes automatically granting the second guest device access to the network service for a remaining portion of the allowed access duration of the login record without requiring the second guest device to successfully complete the login process at the login portal.

According to an exemplary embodiment of the invention there is disclosed a non-transitory processor-readable medium comprising a plurality of processor-executable instructions that when executed by one or more processors cause the one or more processors to perform the steps of the above method.

According to an exemplary embodiment of the invention there is disclosed an apparatus for controlling access to a network service provided over a computer network of a hospitality establishment. The apparatus includes a network interface coupled to the computer network, a storage device, and one or more processors coupled to the network interface and the storage device. By the one or more processors executing software instructions loaded from the storage device, the one or more processors are configured to receive network traffic from a guest device via the computer network, the network traffic including a device identifier of the guest device, and determine, based upon the device identifier, that the guest device is not already authorized to access the network service at a time the network traffic is received, the guest device hence considered to be an unrecognized guest device. The one or more processors are further configured to query a user profile server to determine a user identifier that is associated with the device identifier of the guest device and query the login database to find an unexpired login record of a different authorized guest device associated with the user identifier, the unexpired login record granting the different authorized guest device access to the network service for an allowed access duration. The one or more processors are further configured to automatically grant the unrecognized guest device access to the network service for a remaining portion of the allowed access duration of the unexpired login record of the authorized guest device. The unrecognized guest device is automatically granted access to the network service without the device identifier of the unrecognized guest device being stored in the login database prior to receiving the network traffic from the unrecognized guest device.

According to an exemplary embodiment of the invention there is disclosed a method of controlling access to a network service provided over a computer network of a hospitality establishment. The method includes receiving network traffic from a guest device via the computer network, the network traffic including a device identifier of the guest device, determining, based upon the device identifier, that the guest device is not already authorized to access the network service at a time the network traffic is received, the guest device hence considered to be an unrecognized guest device, and querying a user profile server to determine a user identifier that is associated with the device identifier of the guest device. The method further includes querying the login database to find an unexpired login record of a different authorized guest device associated with the user identifier, the unexpired login record granting the different authorized guest device access to the network service for an allowed access duration; and automatically granting the unrecognized guest device access to the network service for a remaining portion of the allowed access duration of the unexpired login record of the authorized guest device. The unrecognized guest device is automatically granted access to the network service without the device identifier of the unrecognized guest device being stored in the login database prior to receiving the network traffic from the unrecognized guest device.

According to an exemplary embodiment of the invention there is disclosed a non-transitory processor-readable medium comprising a plurality of processor-executable instructions that when executed by one or more processors cause the one or more processors to perform steps of receiving network traffic from a guest device via a computer network, the network traffic including a device identifier of the guest device, and determining, based upon the device identifier, that the guest device is not already authorized to access a network service at a time the network traffic is received, the guest device hence considered to be an unrecognized guest device. The instructions further cause the one or more processors to perform steps of querying a user profile server to determine a user identifier that is associated with the device identifier of the guest device and querying the login database to find an unexpired login record of a different authorized guest device associated with the user identifier, the unexpired login record granting the different authorized guest device access to the network service for an allowed access duration. The instructions further cause the one or more processors to perform steps of automatically granting the unrecognized guest device access to the network service for a remaining portion of the allowed access duration of the unexpired login record of the authorized guest device. The unrecognized guest device is automatically granted access to the network service without the device identifier of the unrecognized guest device being stored in the login database prior to receiving the network traffic from the unrecognized guest device.

These and other advantages and embodiments of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof, wherein:

FIG. 3 illustrates an exemplary set of login data in the login database of FIG. 1, each login record storing a stored guest identifier corresponding to information retrieved from a property management system (PMS) of the hospitality establishment regarding a guest of the guest area at a time when the login record was created;

FIG. 6 illustrates an exemplary network map of the hotel's LAN as utilized in the final step of the flowchart in FIG. 5;

FIG. 7 illustrates a user interface (UI) screen provided by the UI module and/or the user profile server of FIG. 1 allowing modification of information stored in a user profile database for an exemplary user;

FIG. 9 illustrates an exemplary property management system (PMS) database storing current guest identifiers corresponding to current guests for each of the guest areas in the hospitality establishment.

DETAILED DESCRIPTION

Figure 1:
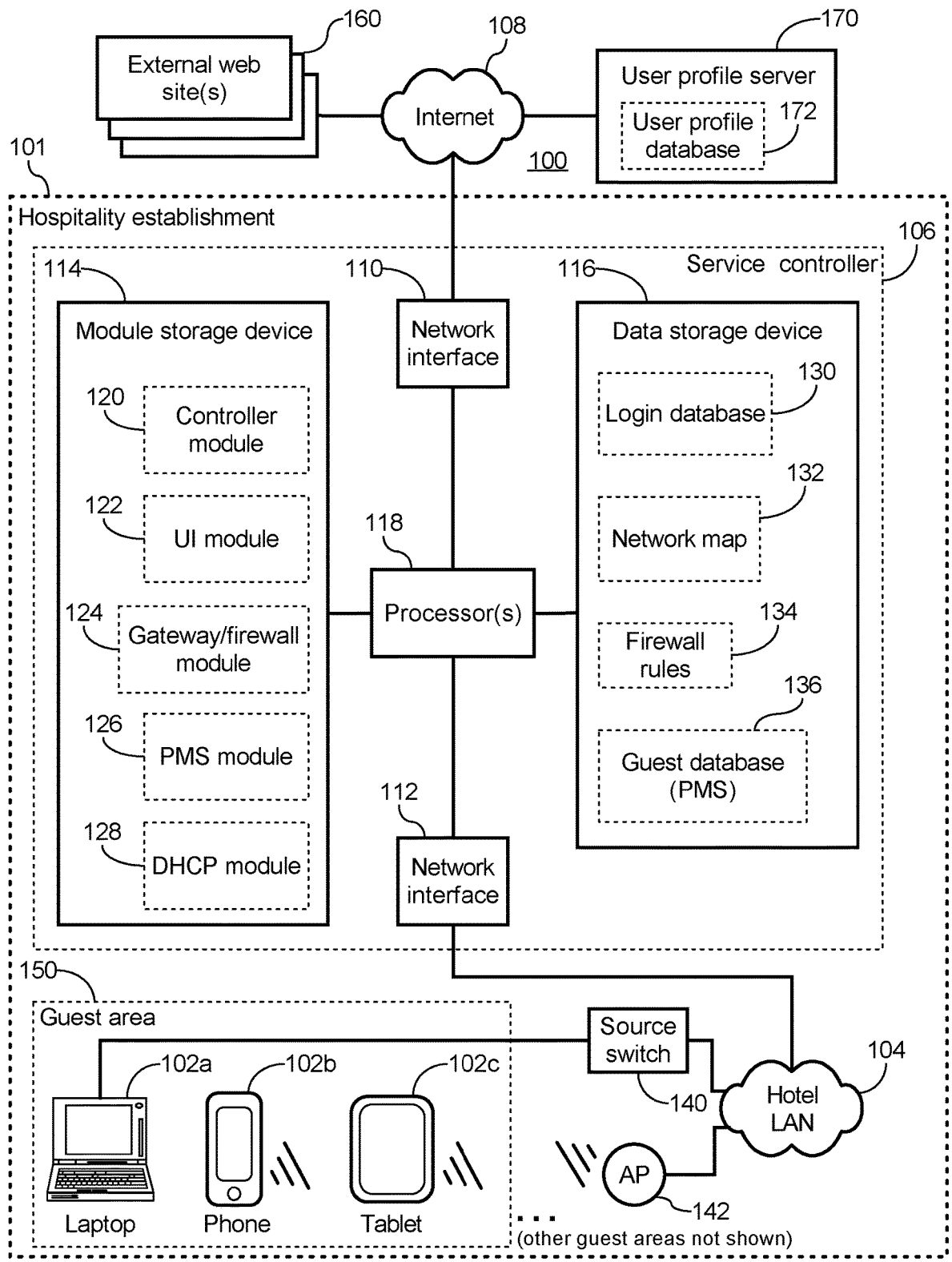
FIG. 1 is a block diagram of a system for allowing a guest of a hospitality establishment to access a network service from multiple guest devices according to an exemplary embodiment of the invention.

FIG. 1 is a block diagram of a system 100 for allowing a guest of a hospitality establishment 101 to access a network service from multiple guest devices 102 operated by the guest at the hospitality establishment 101 according to an exemplary embodiment of the invention. In this embodiment, the hospitality establishment 101 is a hotel and the network service is high speed Internet access (HSIA) provided to the guest devices 102 over the hotel's computer network 104.

A service controller 106 is coupled between the hotel's LAN 104 and the Internet 108. The service controller 106 in this embodiment is a computer server including a first network interface 110 coupled to the Internet 108 and a second network interface 112 coupled to the hotel's LAN 104. The service controller 106 further includes a module storage device 114 and a data storage device 116, and each of the network interfaces 110, 112 and storage devices 114, 116 are coupled to one or more processors 118. In the following description, the plural form of the word "processors" is utilized as it is common for a central processing unit (CPU) of a computer server to have multiple processors (sometimes also referred to as cores); however, it is to be understood that a single processor may also be configured to perform the below-described functionality in other implementations.

The service controller 106 in this embodiment integrates and performs a variety of functions at the hotel 101. To allow the service controller 106 to perform these functions, the module storage device 114 stores software modules for execution by the processors 118, including a controller module 120, a user interface (UI) module 122, a gateway/firewall module 124, a property management system (PMS) module 126, and a dynamic host control protocol (DHCP) module 128.

Briefly described, the controller module 120 controls the ability of guest devices 102 at the hotel 101 to access the Internet 108 by dynamically reconfiguring the gateway/firewall module 124. The UI module 122 acts as a web server providing the hotel's HSIA login portal, allowing both guests and staff at the hotel 101 to receive information from and interact with the service controller 106. The gateway/firewall module 124 controls network traffic passed between the Internet 108 and the hotel LAN 104 and acts as the default gateway of the hotel's LAN 104. The PMS module 126 manages property-specific details of the hotel 101 such as guest reservations and room assignments. The DHCP module 128 assigns dynamic Internet Protocol (IP) addresses and other network configuration information to new guest devices 102 as they are connected to the hotel's LAN 104.

The data storage device 116 stores data utilized by the processors 118 when performing the functions of the various modules 120, 122, 124, 126, 128. In this embodiment, the data storage device 116 stores a login database 130 containing details of Internet package purchases by guests of the hotel staying in various guest areas 150. A reconfigurable set of firewall rules 134 is followed by the gateway/firewall module 124 to prevent Internet access for unauthorized devices according to a default rule, and includes dynamically added device-specific exceptions to the default rule (i.e., one or more device-specific rules) allowing Internet access for specific guest devices 102 operated by guests who have purchased an Internet package at the hotel 101. A network map 132 stores details of how various network components in the hotel's computer network 104 are interconnected. Finally, the guest database 136 stores details of the current guests, events, and room assignments of the hotel 101 in conjunction with the PMS module 126. In this embodiment, one or more relational database(s) is/are utilized to implement the login database 130 and the guest database 136; however, the term "database" as utilized in this description is meant to refer to any stored collection of organized data.

The hotel 101 includes a number of guest areas 150, of which a single guest area 150 is illustrated in FIG. 1 and assumed to be an individual hotel guest room in this description. Although only a single guest area 150 is illustrated, the hotel 101 may actually include a plurality of different guest areas 150 such as physically separated guest rooms. Meeting rooms and conference areas may also be further guest areas in another example. Logical guest areas 150 may also be employed in other examples, and users may remain associated with separate guest areas 150 even though the users may be physically able to roam throughout the hospitality establishment 101 (e.g., roam into another guest's room or area 150).

Generally speaking, an individual guest of the hotel 101 will be associated with at least one guest area 150; for example, a guest may be assigned to "Guest Room 117" for a two night stay at the hotel 101. The guest may bring to the hotel 101 several personal electronic devices, referred to as guest devices 102 in this description. For example, the guest staying in the guest area 150 illustrated in FIG. 1 has brought a laptop computer 102a, a mobile phone 102b, and a tablet computer 102c. In another embodiment, the guest devices 102 may be provided to the guest by the hospitality establishment 101 rather than being brought to the hotel by the guest.

For illustration purposes, the laptop computer 102a in this example is connected to the hotel's LAN 104 via a wired connection such as an Ethernet cable and port provided in the guest's assigned room 150. The Ethernet port in the guest's room 150 is attached to a particular port of a source switch 140. The mobile phone 102b and the tablet computer 102c in this example are wirelessly connected to the hotel's LAN 104 by the guest wirelessly associating them with a service set identifier (SSID) broadcast by an access point (AP) 142. The service controller 106 (in particular the gateway/firewall module 124 and DHCP module 128), source switch 140, and the AP 142 are examples of network components forming the hotel's computer network 104; other network components in LAN 104 such as other switches and other APs are not shown in FIG. 1 for simplicity purposes.

Concerning the remaining elements illustrated in FIG. 1, a user profile server 170 providing remote access to a central user profile database 172 is coupled to the hotel 101 via the Internet 108. The user profile database 172 stores a plurality of user profiles, each user profile associating one or more user identifiers such as loyalty program member identifiers with one or more guest device identifiers such MAC addresses. The user profile server 170 may further be coupled via the Internet 108 to a plurality of different hospitality establishments such as other hotels and resorts (not shown).

Various external web sites 160 are also shown coupled to the Internet 108 in FIG. 1. These external web sites 160 represent various web servers on the Internet 108 that may be accessed by a guest device 102 at the hotel 101 only after the HSIA service has been activated for that guest device 102, i.e., after the gateway/firewall module 124 has been reconfigured (e.g., firewall rules 134 dynamically modified) by the controller module 120 (or another module such as the UI module 122) to add a device-specific exception rule clearing the MAC address of the guest device 102 for Internet 108 access.

Figure 2:
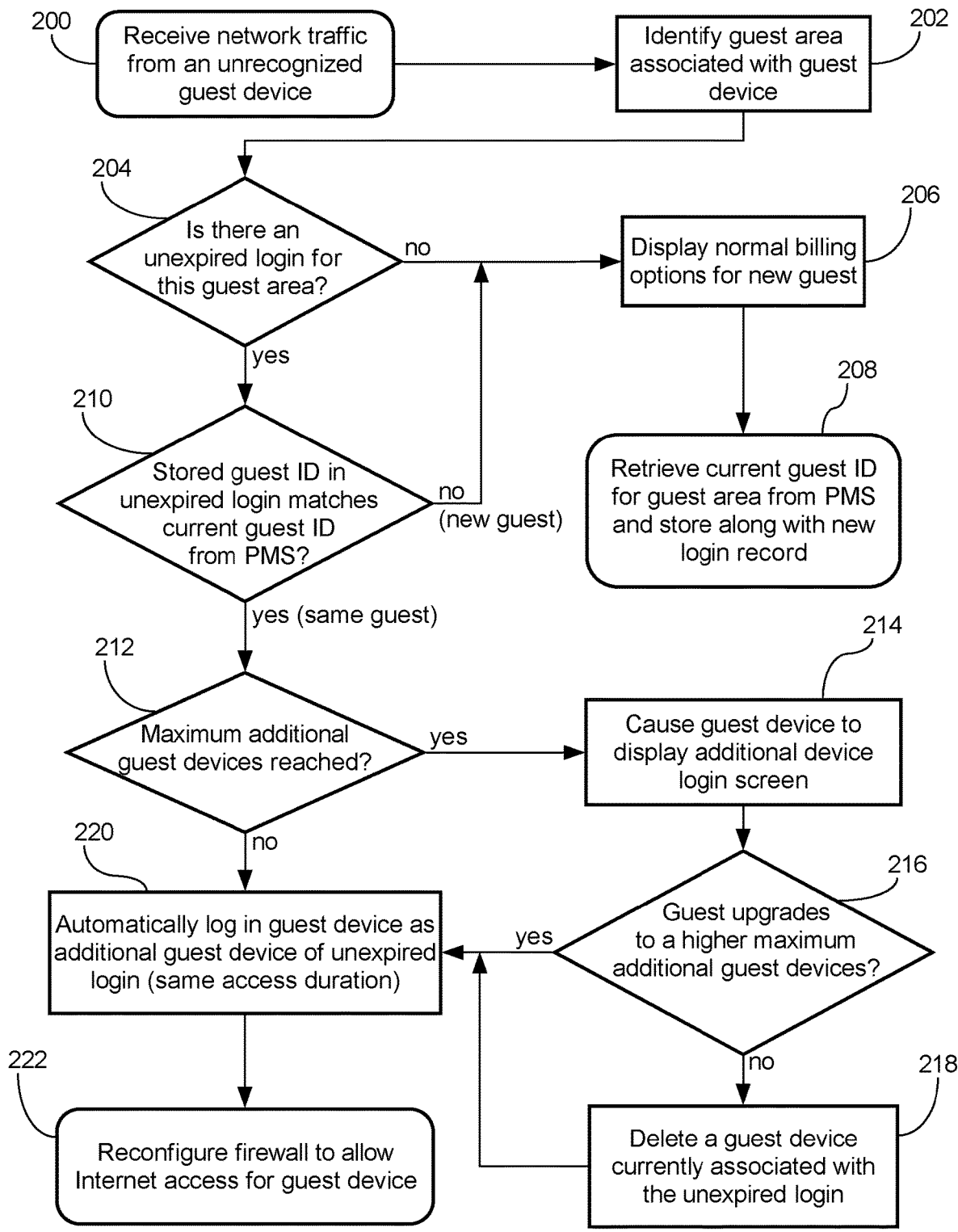
FIG. 2 is a flowchart showing functionality of the service controller of FIG. 1 when controlling access to the network service.

FIG. 2 is a flowchart showing functionality of the service controller 106 of FIG. 1 when controlling the ability of a guest device 102 connected to the hotel's computer network 104 to access to the hotel's HSIA service according to an exemplary embodiment of the invention. The steps of the flowchart of FIG. 2 are not restricted to the exact order shown, and, in other embodiments, shown steps may be omitted or other intermediate steps added. In this embodiment, the processors 118 execute one or more of the modules 120, 122, 124, 126, 128 in order to cause the service controller 106 to perform the illustrated steps.

The process begins at step 200 when the service controller 106 receives network traffic from an unrecognized guest device 102 on the hotel's computer network 104. In some cases, the network traffic is received at the hotel's web based login portal provided by the UI module 122. This could happen, for example, as a result of the default rule of the firewall rules 134 redirecting the unrecognized guest device 102 to the login portal upon its first web site request. However, in other embodiments, the network traffic need not be web traffic and may instead/or in addition be any type of network traffic transmitted on the LAN 104 by the unrecognized guest device 102. For example, in some particularly advantageous embodiments, the network traffic received at this step is a dynamic host control protocol (DHCP) message broadcast by the unrecognized user device when it is first connected to the hotel's computer network 104.

Typical guest devices 102 will utilize DHCP to configure themselves for the hotel LAN 104 upon initial connection (either wired or wireless) by immediately broadcasting DHCP messages such as DHCP discover/request. The DHCP module 128 (or another DHCP server on the hotel LAN 104) responds to the newly connected user device 102 with DHCP offer/acknowledgement. These messages pass various network configuration information such a dynamic IP address assigned to the guest device 102, a default gateway IP address for use by the user device 102 when sending network traffic to destinations off a local subnet (set to the IP address of the gateway/firewall module 124 in this example), and a netmask setting allowing the user device 102 to determine which destination addresses are off the local subnet. Regardless of whether the DHCP module 128 (or another DHCP server) is located within or external to the service controller 106, because the DHCP messages are broadcast on the hotel LAN 104, the controller module 120 is able to receive the DHCP messages.

In yet another embodiment, the network traffic received from an unrecognized user device 102 may be a request to access an external web site 160 on the Internet. Such network traffic will be received by the default gateway (i.e., gateway/firewall module 124), which will automatically block the request according to its default rule for unrecognized guest devices 102. Since the gateway/firewall module 124 in this embodiment is included within the service controller 106, any request from a device on the hotel's LAN 104 to access an external web site 160 will be received at the service controller 106 (e.g., acting as the default gateway for the hotel's LAN). Receiving the network traffic at the gateway/firewall module 124 does not require redirecting the unrecognized user device 102 to the login portal provided by the UI module 122, although this may still occur in some situations such as when the service controller 106 cannot automatically identify a particular guest area 150 that is associated with the unrecognized guest device 102 without requiring the user to enter or verify some information at the login portal.

Combinations of these and other types of received network traffic may also be employed. For example, the controller module 120 may support receiving network traffic being a DHCP message from some guest devices 102, connection requests for external web sites 160 from other guest devices 102, and data entered by the guest at the hotel's login portal provided by UI module 122 from yet other guest devices 102.

The unrecognized guest device 102 from which the network traffic is received at step 200 is considered unrecognized because it has not already been granted access to the Internet 108. For example, after a guest has purchased Internet access at the hotel utilizing mobile phone 102*b*, the mobile phone 102*b* device identifier (e.g., MAC or IP address) is recorded in the login database 130 along with its associated guest area 150 of the hotel 101, Internet access expiry time, and other details regarding its service entitlements such as bandwidth and allowed number of guest devices. After the initial purchase, the mobile phone 102*b* is considered "logged in" to the hotel's HSIA service and it will be able to access web sites 160 on the Internet 108 until its login access duration expires (e.g., 24 hours after purchase of a package providing 1-day of Internet access). After the expiry time is reached, it will be considered "logged out" meaning it will lose Internet access because the rule clearing the mobile phone 102*b* for Internet 108 access is removed from the firewall rules 134. In some embodiments, the login record is removed from the login database 130 by the controller module 120 at logout; however, in a preferred embodiment the login record is moved to an archive database (not shown) to keep a historical record of previously logged in devices in case there is a later dispute of the billing record and for statistical purposes.

FIG. 3 illustrates an exemplary set of login data for a plurality of purchased Internet packages as stored in the login database of FIG. 1. The login data is organized as a database table having one row per guest device 102 with data stored in columns. The "Device ID" column 300 stores the unique device identifier (e.g., MAC address) of the guest device 102. IP addresses assigned to the guest device 102 by the DHCP module 128 may also be utilized as the guest device identifier in this column 300. The "Stored guest ID" column 302 specifies a stored guest identifier representing the guest of the hospitality establishment 101 registered for the guest area (in column 304) as retrieved from the PMS at the time of the purchase. The stored guest identifier in column 302 is retrieved from the hotel's PMS database 136 at the time of the login record is created. The "Guest area" column 304 stores the guest area 150 to which the row of the login database pertains. The "HSIA expiry" column 306 stores the expiry date and time of the login record. The "Max. bandwidth" column 308 stores the bandwidth entitlement specified as a maximum bandwidth cap that will be provided to the guest device 102 assuming the hotel's full bandwidth capacity is not at 100% utilization. Finally, the "Allowed guest devices" column 309 specifies the maximum number of guest devices 102 that the guest is allowed to utilize under their Internet package without incurring an additional monetary charge. The shown columns are meant as an example and other or different columns of login data may be utilized in different embodiments.

In this example, an unrecognized guest device 102 is any guest device 102 on the hotel LAN 104 with a MAC address that does not match a guest device identifier stored in column 300 for an unexpired row of the login database 130.

Returning again to the description of FIG. 2, at step 202, the controller module 102 identifies a guest area 150 of the hotel 101 with which the unrecognized guest device 102 is associated. This identification is done at least in part according to the received network traffic. In some situations, the network traffic itself includes data specifying the associated guest area 150, for example, a user may click an "Already Purchased?" button on the hotel's web based login portal provided by the UI module 122 and provide their last name and room number to verify their identify. In this situation, the guest area 150 determined at this step according to the received network traffic is simply the room number provided to the login portal by the guest, assuming that the entered name matches that of the current guest staying in the specified room according to the hotel's PMS database 136. When the guest's identify is thus verified, the login portal simply extracts the designation of the guest area 150 from within the network traffic and determines the unrecognized user device 102 to be associated with that designated guest area 150.

In other situations, the network traffic itself may not explicitly designate the guest's room number. For example, when the network traffic received at step 200 is a DHCP message or a connection request for an external web site 160, the network traffic will typically not include any room number (or other guest area 150 designation) for direct extraction by the controller module 120. In these situations, there are at least two techniques that the controller module 120 can utilize to automatically identify the guest area 150 with which the unrecognized guest device is associated according to the received network traffic: 1) room detection and 2) device identifier lookup.

Room Detection

Room detection involves tracing the network traffic received from the unrecognized guest device 102 to a source access-node on the hotel's computer network 104, and then looking up the guest area 150 that is mapped to the source access-node in the hotel's network map 132. This technique is particularly well-suited when the unrecognized guest device 102 is connected to the hotel's computer network 104 utilizing a wired network connection such as 10/100 Ethernet; however, it may also be employed in some network layouts when the guest device 102 is connected via a wireless connection.

Figure 4:
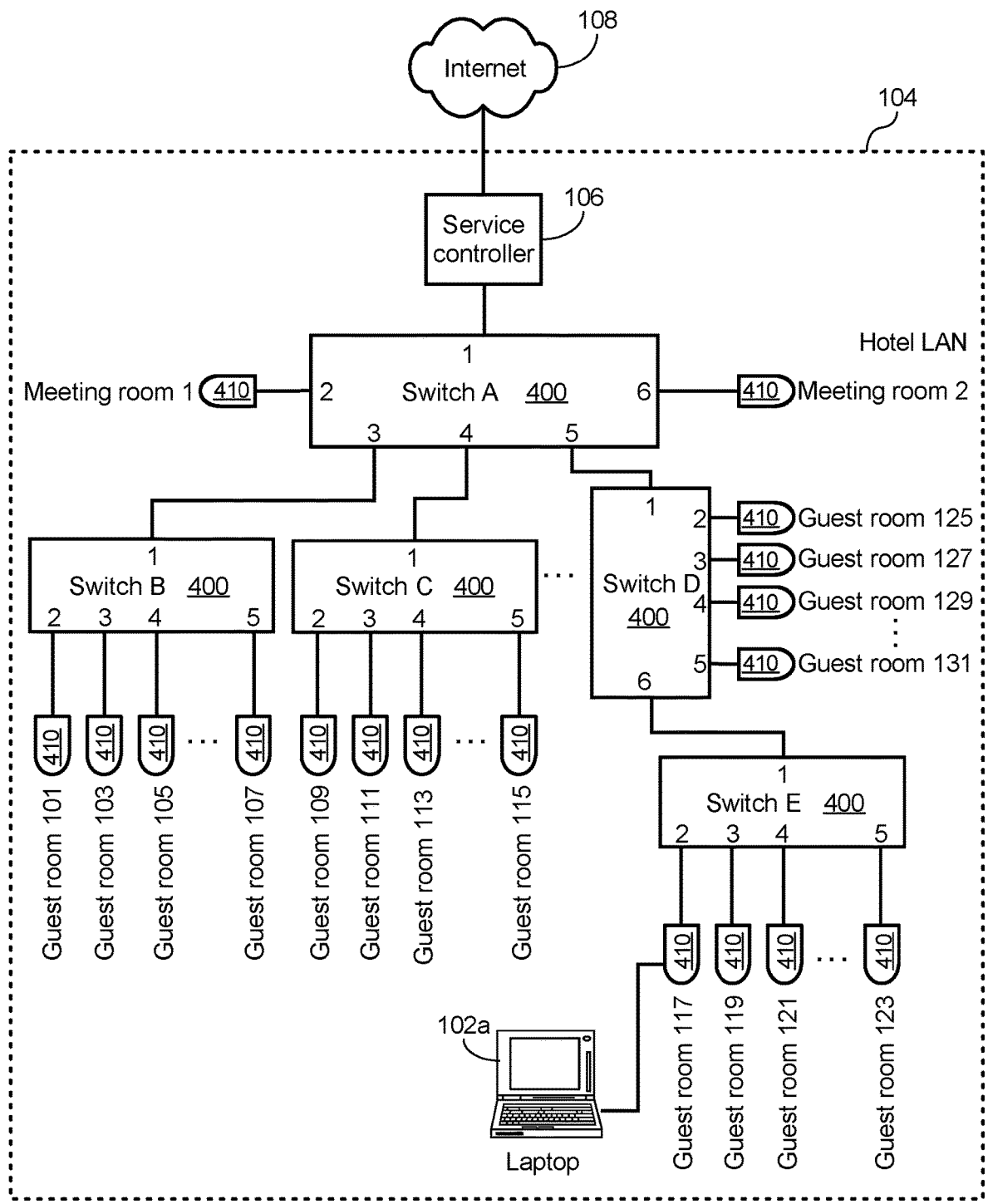
FIG. 4 is a block diagram of a wired portion of the hotel's local area network of FIG. 1.
Figure 5:
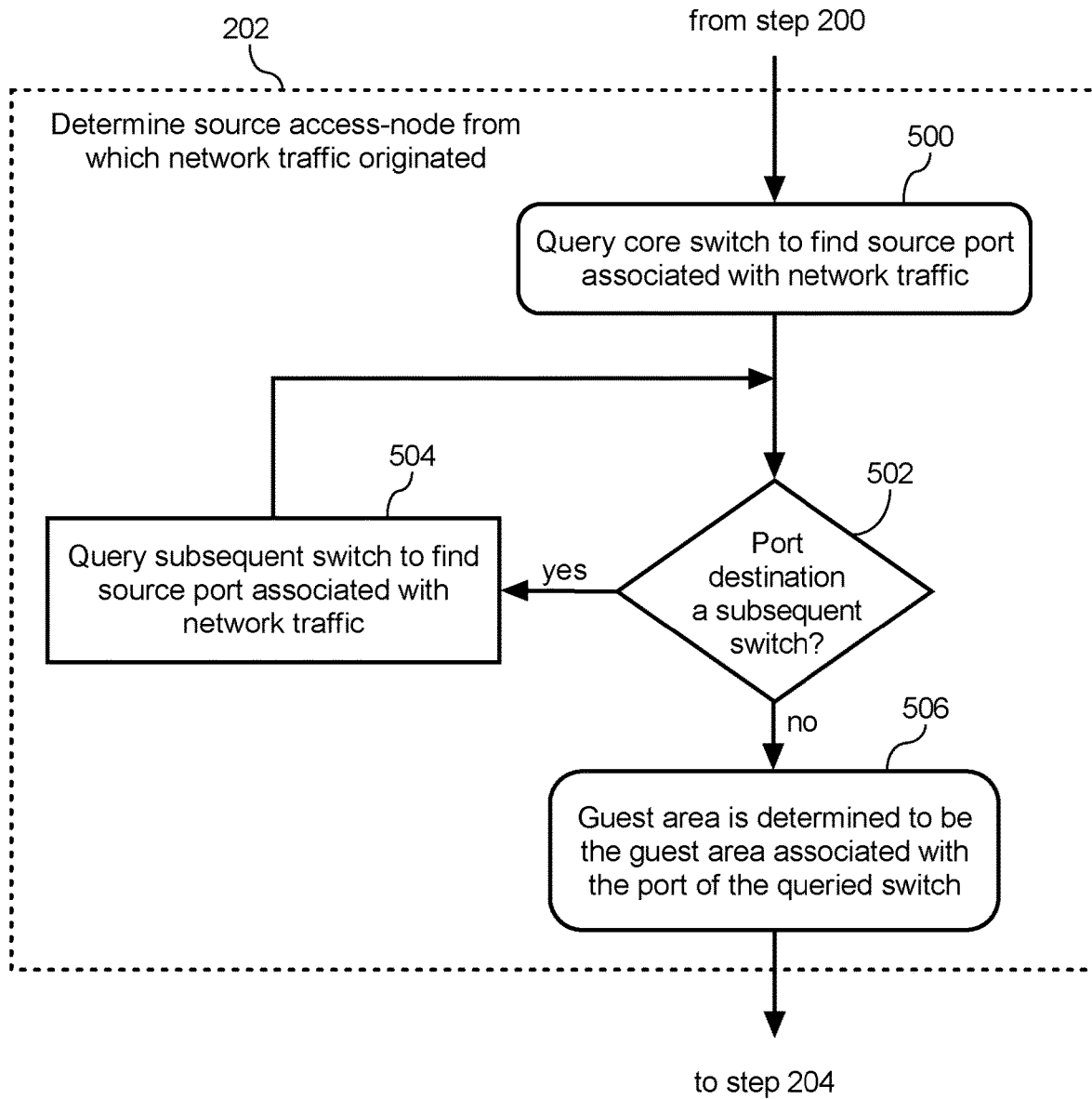
FIG. 5 is a flowchart describing functionality of the service controller of FIG. 1 automatically identifying a guest area of the hotel of FIG. 1 by performing room detection, which involves tracing network traffic received from a guest device to a source access-node of the hotel LAN illustrated in FIG. 4.

FIGS. 4, 5, and 6 help explain how automatic room detection in step 202 is performed assuming the unrecognized user device 102 from which the network traffic is received at step 200 is the guest's laptop computer 102a. FIG. 4 is a block diagram of an example wired portion of the hotel's local area network 104, FIG. 5 is a flowchart describing functionality of the controller module 120 automatically identifying a guest area 150 of the hotel of FIG. 1 in response to receiving network traffic from the laptop computer 102a over the wired portion of the hotel LAN 104, and FIG. 6 illustrates an exemplary network map of the hotel's LAN as utilized in the final step of the flowchart in FIG. 5. The steps of the flowchart of FIG. 5 are not restricted to the exact order shown, and, in other embodiments, shown steps may be omitted or other intermediate steps added. In this embodiment, the processors 118 execute one or more of the modules 120, 122, 124, 126, 128 in order to cause the service controller 106 to perform the illustrated steps.

As shown in FIG. 4, the hotel's LAN 104 includes a plurality of switches 400 where ports 410 of each switch 400 are connected to Ethernet ports available in various guest rooms of the hotel 101. For example, each switch port 410 may be connected by an Ethernet cable to an in-room Ethernet port. A guest in the exemplary "Guest room 117" connects their laptop computer 102a to the in-room Ethernet port, and network traffic from the laptop computer 102a enters the hotel's computer network 104 via "Port 2" of "Switch E". This point of entry of the network traffic is designated the source access-node for laptop 102a in this description.

As shown in FIG. 5, the controller module 120 can automatically determine the source access-node for laptop 102a by querying the switches 400 (e.g., recursively) to report the port 410 on which the network traffic was received until the source access-node is eventually reached.

At step 500, the controller module 120 utilizes simple network management protocol (SNMP) to query the core switch (e.g., "Switch A") of the hotel's LAN 104 to find the port that is associated with the device identifier (e.g., MAC address or IP address) of the laptop 102a as specified in the received network traffic. The core switch (e.g., "Switch A") will have heard this device identifier in network traffic received from "Port 5". At step 502 the controller module 120 checks the network map 132 (see FIG. 6) to find out that "Port 5" of "Switch A" is connected to a subsequent "Switch D". Therefore, at step 504 the controller module 120 sends SNMP commands to "Switch D" to find out which port of that switch is associated with the MAC (or IP) address of the laptop computer 102a. "Switch D" reports that "Port 6" is associated with this network traffic and, again according to the network map 132, the controller module finds that the destination is another subsequent switch ("Switch E") at step 502. Step 504 is repeated by querying "Switch E" and finally "Port 2" of this switch is found associated with the MAC (or IP) address of the laptop 102a specified in the received network traffic. Because this port is not connected to a subsequent switch in the network map 132, the process moves from step 502 to step 506. In this way, the controller module determines the unrecognized laptop computer 102a is associated with "Guest room 117" because this is the destination of "Port 2" of "Switch E" (the source access-node) in the network map 132 (see row 600 in FIG. 6).

Although the above example of automatic room detection is focused on wired connections through switches 400 of the hotel LAN 104, other types of network components may also be queried in a similar way. For example, the same process may be utilized at some hospitality establishments 101 where each guest area 150 has its own micro-coverage AP 142. In such a design, each guest area 150 is serviced by its own AP 142 and therefore the network map 132 can further specify the destination guest area 150 served by each AP 142. When network traffic is traced back to a switch port that is connected to a particular AP 142, the unrecognized guest device 102 is therefore determined by the controller module 120 to be associated with the guest area 150 serviced by that particular AP 142. In another example, some APs also support remote queries of whether a specified MAC address (or IP address) is currently associated therewith and to what SSID. Such APs can also be queried by the controller module 120, and the resulting identified SSID mapped to a particular source access-node such as where each guest area 150 is served by a unique SSID.

Device Identifier Lookup

Device identifier lookup involves querying one or more databases to determine whether the device identifier specified in the network traffic received at step 200 can be matched or otherwise cross-referenced to a particular guest area 150 of the hotel. This technique is employable regardless of the network layout of the hotel LAN 104, and is not dependent on the type of connection between the unrecognized guest device and the hotel LAN 104 (e.g., connection can be any type of wireless or wired connection).

Figure 8:
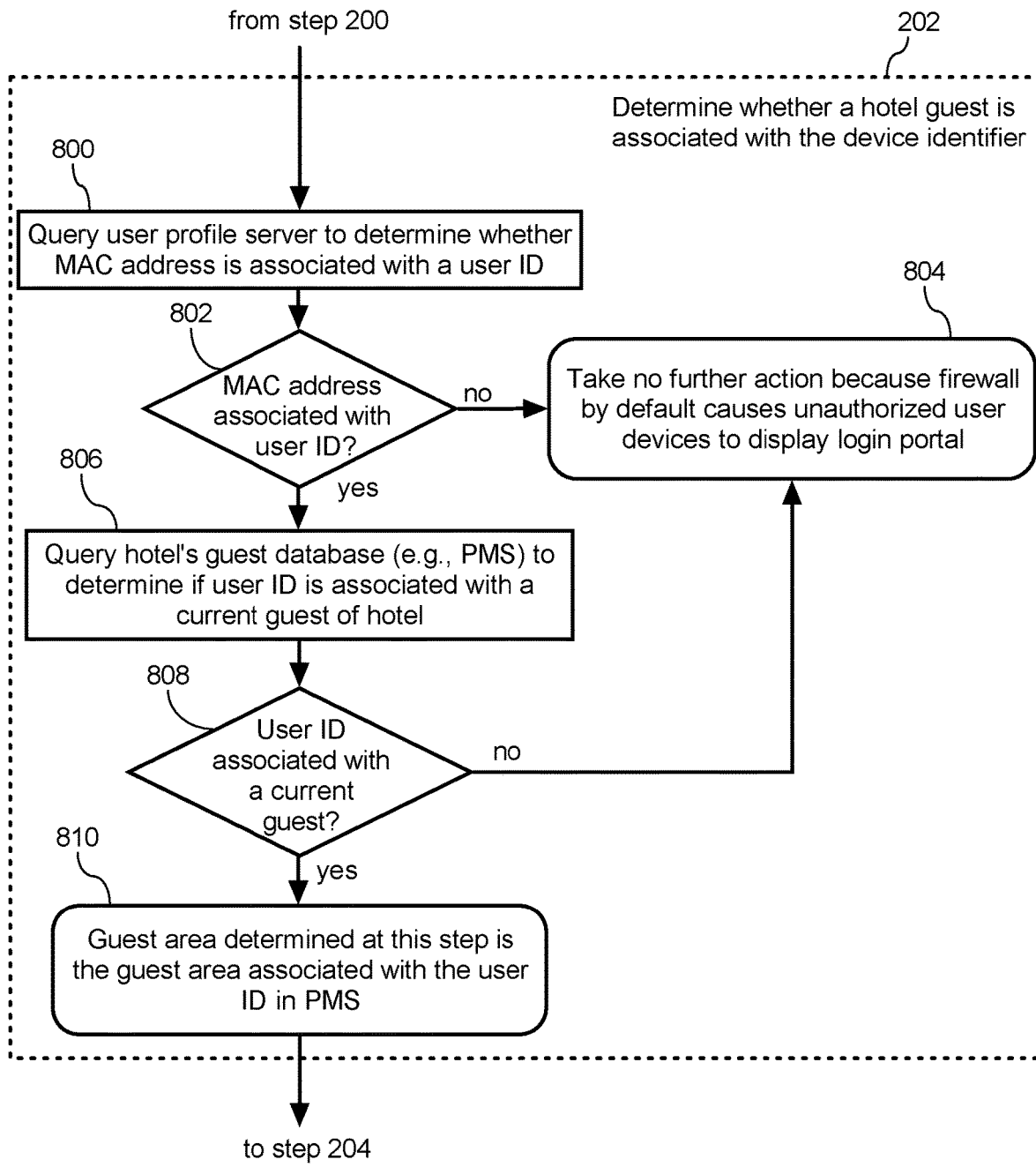
FIG. 8 is a flowchart describing functionality of the service controller of FIG. 1 automatically identifying a guest area of the hotel of FIG. 1 by performing device identifier lookup when receiving network traffic from a guest device having a device identifier associated with a particular user in the user profile database of FIG. 1.

FIGS. 7, 8, and 9 help explain how automatic device identifier lookup in step 202 is performed, again assuming the unrecognized user device 102 from which the network traffic is received at step 200 is the guest's laptop computer 102a. In this example, the controller module 120 queries the user profile server 170 over the Internet 108 to see if a specific user profile has registered a personal device having a MAC address matching the MAC address specified in the network traffic received at step 200. When there is such a user profile, the controller module 120 checks the hotel's guest database 136 (e.g., PMS) to see if one of the user identifiers associated with that user profile is associated with a current guest of the hotel 101. When yes, the controller module 120 can thereby correlate the unrecognized guest device to a specific guest area of the hotel 101, for example, the current guest's registered room as retrieved from the hotel's PMS 136.

FIG. 7 illustrates a user interface (UI) screen 700 provided by the UI module 122 and/or the user profile server 170 allowing a specific user to modify their information in the user profile database 172. As shown in FIG. 7, each user may have any number of guest devices 102 associated with their user profile account. Device names are listed in column 702 with each user device's corresponding device identifier (e.g., MAC address) shown in column 704. These fields are editable by the user, and the user may add new user devices or remove user devices to their user profile at any time.

The UI screen 700 further allows each user to modify the user identifiers associated with their account. As shown in FIG. 7, the user identifiers associated with the account in this example are all the various loyalty program membership numbers utilized by the user at different hospitality establishments. Each hospitality establishment is listed in column 710 with the user's corresponding loyalty program member identifier and user type listed in columns 712 and 714, respectively. In some embodiments, the user may be able to freely adjust the loyalty numbers in column 712, but may need to perform an upgrade process by clicking an "upgrade" button 720 in order to upgrade to higher user type at a particular hospitality establishment in column 714. The upgrade process may involve a monetary payment.

In addition to the UI module 122 within the service controller 106 at the hotel 101, the user profile server 170 may also be operable to provide web-based access to UI screen 700. In this way, any user may access their user profile UI screen 700 from any location over the Internet 108. Before accessing UI screen 700, users may need to authenticate themselves to either the UI module 122 or the user profile server 170 such as by entering a username/password combination. Additionally, staff at the hotel 101, call center support staff, and administrators of the user profile server 170 may be able to access the UI screen 700 for any user account in order to assist users when required.

An exemplary use case scenario of UI screen 700 proceeds as follows: A user creates a user profile on the user profile server 170. By interacting with UI screen 700, the user stores on their user profile the MAC addresses of the electronic devices 102 they will take with them while travelling, and stores the loyalty program number identifiers belonging to the user at the various hospitality establishments at which the user will be (or might be) a guest. The user then travels to any of the listed hospitality establishments and connects any of the listed user devices 102 to the local LAN 104 available at the hospitality establishment.

Taking the situation where the user has already purchased Internet access at the hotel 101 (e.g., utilizing their mobile phone 102b or another method such as adding an Internet package to their room during the check-in procedure at the front desk), upon connecting an unrecognized guest device 102 such as their laptop computer 102a to the network 104, the laptop computer 102a utilizes DHCP in order to obtain an IP address on the LAN 104. The process shown in FIG. 2 thus begins at step 200 when receiving a DHCP message from the unrecognized laptop 102a and control proceeds to step 202 to identify a guest area 150 with which the laptop 102 is associated.

FIG. 8 is a flowchart describing functionality of the controller module 120 automatically identifying a guest area 150 of the hotel of FIG. 1 by looking up a device identifier (e.g., MAC address) specified in the received network traffic. The steps of the flowchart of FIG. 8 are not restricted to the exact order shown, and, in other embodiments, shown steps may be omitted or other intermediate steps added. In this embodiment, the processors 118 execute one or more of the modules 120, 122, 124, 126, 128 in order to cause the service controller 106 to perform the illustrated steps.

At step 800, the controller module 120 queries the user profile database 172 to determine whether there is a user identifier (ID) that is associated with the MAC address of the unrecognized laptop 102a specified in the network traffic received at step 200. As shown in FIG. 1, the user profile database 172 in this embodiment is stored remote to the hotel 101 at a central user profile server 170. Therefore, this step may be performed by the processors 118 sending and receiving network packets to/from the user profile server 170 via the first network interface 110 and the Internet 108.

With reference to UI screen 700 in FIG. 7, the user profile database 172 associates each of a plurality of different user identifiers (IDs) in column 712 with one or more device identifiers (e.g., MAC addresses in this embodiment) in column 704. A collection of different user IDs may be associated with multiple MAC addresses such as when a single user has various loyalty program member identifiers at different hospitality establishments and owns multiple user devices 102. For example, the exemplary user in FIG. 7 belongs to five different hospitality loyalty programs and has three MAC addresses corresponding to three different guest devices (i.e., laptop computer 102a, mobile phone 102b, and tablet computer 102c). Additionally, a single MAC address may be associated with multiple user IDs, for example, the MAC address of the laptop computer 102a may also be associated with other user profile accounts such as when multiple users share a corporate loaner laptop provided as needed to different employees for travel.

In some embodiments, each hospitality establishment has a unique site identifier (column 710 of FIG. 7) and this site identifier may be utilized by the controller module 120 at that establishment 101 when querying the user profile database 172 in order to obtain the loyalty program member identifier associated with the MAC address at the specific hospitality establishment where the MAC address was detected.

For example, when the user is staying at the "Galactic Hotel (4)", the MAC address of the user's laptop 102a ("20-B0-D0-86-BB-F9") is determined to be associated with user identifier "122-32-2345". Alternatively, when the user is staying at the "Beaches Resort (135)", the same MAC address of the user's laptop 102a ("20-B0-D0-86-BB-F9") is determined to be associated with a different user identifier "5E3DA7". The user may thereby travel to different hospitality establishments having different types of the loyalty program member identifiers, and the user's various guest devices can still be correlated to the user's respective user identifier as employed at each of the different hospitality establishments.

At step 802, when the received MAC address is not associated with any user identifiers (IDs) in the user profile database 172, control proceeds to step 804. Otherwise, when the received MAC address is associated with one or more user identifiers (IDs) in the user profile database 172, the particular user identifiers (IDs) are retrieved from the user profile database and control proceeds to step 806.

At step 804, the controller module 120 takes no further action for this unrecognized user device 102 because the hotel's gateway/firewall module 124 by default prevents unrecognized user devices 102 from accessing the Internet 108 and instead causes them to display the hotel's predetermined login portal such as provided by the UI module 122. One of the previously described methods of identifying a guest area associated with the unrecognized guest device such as automatic room detection or having the guest input their room number during a sign-up procedure at the login portal may still be performed at step 202 of FIG. 2.

At step 806, the controller module 120 queries the guest database 136 of the hotel 101 to determine whether a current guest of the hospitality establishment is associated with any of the particular user identifiers (IDs) found associated with the detected MAC address.

FIG. 9 illustrates an exemplary property management system (PMS) database 136 storing current guest identifiers for each of the guest areas 150 in the hotel 101. In this example, the guest database 136 is the PMS database used by the PMS module 126 for room assignment at the hotel 101. In other embodiments, the PMS database 136 may actually be a cached version of the true PMS database 136, which is stored in another standalone PMS apparatus (not shown). When the PMS database 136 is a cached version, the PMS module 126 may be operable to periodically retrieve information from the standalone PMS apparatus for storage in the local, cached PMS database 136.

A room number column 900 indicates the particular guest area 150, a last name column 902 indicates the last name of the current guest of that guest area 150, the first name column 904 indicates the guest's first name, a check-in time column 905 indicates the date and time that the guest checked in to the guest area 150, and a current guest identifier (ID) column 906 indicates an identifier of the current guest such as the loyalty program membership identifier used by the guest at the hotel 101. Vacant rooms have a dash ("-") in columns 902, 904, 905, 906 in this example.

In a preferred embodiment, the user identifiers (IDs) stored in column 712 of FIG. 7 and the current guest identifiers in column 906 of FIG. 6 are loyalty program member identifiers utilized by the user. A unique user ID is assigned to each guest participating in the hotel's loyalty program such by issuing the guest with a membership card having the user identifier printed thereon. When a guest makes a reservation or when checking into the hotel 101, the guest provides the hotel 101 with the user's personal user identifier (e.g., loyalty program member identifier), which is thereafter stored in column 906 of the PMS database 136 as the current guest identifier associated with the assigned room. Discounts, points and/or other benefits may be offered to loyalty program members to encourage guests to register their loyalty numbers upon reservation and/or check-in at the hotel 101.

Utilizing loyalty program member identifiers as the user/guest identifiers is beneficial to ensure each guest has a unique identifier. However, other types of user/guest identifiers may also be utilized in other embodiments. For example, check-in time and/or combinations of a user's personal identification information provided to the hotel upon reservation or check-in (name, age, phone #, credit card information, passport number, username, password, etc.) may also be utilized as the user/guest identifier in other embodiments.

At step 808, when a current guest of the hotel 101 is associated with one of the particular user identifiers, control proceeds to step 810 to continue the process. Otherwise, when no current guest of the hotel 101 is associated with any of the particular user identifiers determined at step 806, the users associated with these user identifiers (IDs) are not current guests of the hotel 101. Therefore, no room is determined to be associated with the unrecognized laptop computer 102a using automatic device identifier lookup (control returns to step 804). Other methods of identifying a guest area associated with the unrecognized guest device such as automatic room detection or having the guest input their room number during a sign-up procedure at the login portal may still be performed at step 202 of FIG. 2.

At step 810, the unrecognized guest device 102 is automatically determined to be associated with the guest area 150 found registered to the guest of the hotel 101 at step 808. Assuming the guest is the exemplary user of FIG. 7 and the hotel 101 is the "Galactic Hotel (4)", the MAC address "20-B0-D0-86-BB-F9" of the unrecognized laptop 102a will be found associated with guest identifier "122-32-2345" in the user profile database 172 (step 802). Therefore, the controller module 120 determines the unrecognized laptop computer 102a to be associated with "Guest room 117" because this is the guest area 150 associated with guest identifier "122-32-2345" in the hotel's PMS database 136 (see step 808 of FIG. 8 and row 910 of FIG. 9).

Continuing the description of the overall process in FIG. 2, assuming that a guest area 150 of the hotel 101 has now been identified by the controller module 120 at step 202 [e.g., by utilizing any suitable method such as one of 1) receiving the room number from the guest device as entered into a web-based login portal, 2) automatically detecting through room detection tracing the network traffic back to a source access-node, and/or 3) looking up a user associated with the guest device identifier of the received network traffic and searching the hotel's PMS database 136 to find the room for which that user is currently registered], control proceeds to step 204.

At step 204, the controller module 120 checks to see if there is an unexpired login record for the identified guest area 150 (e.g., "Guest room 117") in the login database 130. As previously described, column 306 of the login database 130 specifies the expiry time for each already purchased Internet package at the hotel 101. By searching for any rows that have the identified guest area 150 in column 304 and have an expiry time in column 306 that is still in the future, the controller module 120 can determine whether an unexpired login exists for the identified guest area 150. For example, the unexpired login 312 in FIG. 3 indicates that another guest device 102 (e.g., MAC-5) associated with the identified guest area 150 ("Guest room 117") has previously been granted Internet 108 access and that an allowed access duration for the other guest device 102 has not yet expired. When an unexpired login exists for the identified guest area 150, control proceeds to step 210; otherwise, when there is no unexpired login for that guest area 150, control proceeds to step 206.

At step 206, the controller module 120 takes no further action because no guest of the identified guest area 150 has already purchased an Internet package (or all previously purchased packages associated with that guest area 150 have expired). The unrecognized guest device 102a is therefore directed to the hotel's login portal by the gateway/firewall module 124 according to the default rule of the firewall rules 134. At the login portal, the guest can select one of the available Internet access packages at the hotel 101 and arrange payment options, e.g., credit card, add to room folio, cash payment at front desk, etc. This is similar to a normal Internet sign-up process as described in the background section. Once an Internet package has been purchased, control proceeds to step 208.

At step 208, the UI module 122 providing the login portal creates a login record for the guest area 150 identified during the login process. For example, when the user identifies that they are in "Guest room 117" during the billing process, a login record such as row 312 is created in the login database 130. Any of the above-described methods for identifying a guest area associated with a guest device at step 202 (e.g., room detection, device identifier lookup) or another method may also be applied by the UI module 122 during the Internet sign-up process to avoid the need for the guest to manually specify their room number at the login portal.

Once the guest area 150 is identified during the purchase process, the value of the guest identifier for storage in column 302 of the login record 312 is automatically retrieved for that guest area 150 by the UI module 122 from the hotel's PMS database 136. For example, the guest identifier for storage in column 302 can be the loyalty member of the current guest in the identified room as retrieved from column 906 of the PMS database 136. This embodiment beneficially does not require that the guest provide their guest identifier (e.g., value stored in column 906 of the PMS database 136) during the HSIA sign-up process at the login portal. In a preferred embodiment, when the guest is initially signing up for Internet access and connecting to the LAN 104 over a wireless connection, the hotel's login portal requires the guest to type in their last name and room number during the HSIA sign-up process to verify their identify. The last name and room number are checked against the PMS database 136 to confirm that the last name entered really matches the current guest of the specified room. In this way, the charge for the selected Internet package can be added to the guest's room folio. Alternatively, device identifier lookup can be utilized to automatically identify the guest and room number without requiring this information to be entered by the guest at the login portal. When the guest is connecting to the LAN 104 over a wired connection, automatic room detection as described above can be performed by the UI module 122 so the guest is not required to enter their room number or last name during the Internet signup process.

The UI module 122 then retrieves the current guest's loyalty number (or other guest identifier) from column 906 the PMS 136 for the identified guest room 150 and stores it as the stored guest identifier in column 302 of the room's login record (e.g., see login record 312 for "Guest room 117" in FIG. 3). As previously noted, it is not required that the stored guest identifier stored in column 302 must be a loyalty program member number, last names or other guest information such as check-in time may be used instead, but loyalty program numbers are preferred when available because they are unique to each guest, already stored in the hotel's PMS database 136, and can be automatically retrieved after the guest area 150 is identified during the HSIA sign-up process.

As shown in FIG. 9, the PMS database 136 in this example specifies the check-in time in column 905 for each guest area 150. This check-in time 905 (or last guest check-out time etc.) may be utilized as another type of guest identifier. For example, a particular guest of the hotel 101 can be identified as being the guest who checked into "Guest room 117" at 00:01 on Aug. 18, 2012. Using the guest's check-in time in column 905 as the guest identifier rather than the loyalty program identifier in column 906 is useful at hospitality establishments 101 where guests are anonymous or when a guest does not provide any personal information such as a loyalty member identifier to the hospitality establishment 101. In these situations, the check-in time of the identified guest area 150 in column 905 at the time of HSIA purchase/initial login is stored as the stored guest identifier in column 302 of the login database 130. The stored guest identifier 302 is later compared with the current guest identifier being the check-in time of the current guest of the identified guest area 150 in column 905 as retrieved from the PMS database 136 when a future unrecognized guest device 102 is found to be associated with that room (see below description of step 210).

Combinations of different fields of data in the PMS database 136 such as user information (last name 902/first name 904) hashed with check-in time in column 905 may also be utilized by the controller module 120 as an automatically generated guest identifier in column 906. Similar to utilizing loyalty program identifiers, this allows different guests having the same first/last name to be differentiated by forming their respective guest identifiers in column 906 according to check-in time 905 hashed or otherwise combined with other guest information such as last name 902 and/or first name 904.

Step 210 of the flowchart in FIG. 2 is reached when there is already an unexpired login for the guest area 150 identified at step 202. In other words, the unrecognized user device 102 is known to be associated with a guest area 150 of the hotel 101 that has an unexpired HSIA login record. In this situation, the unrecognized guest device 102 may or may not be an additional guest device of the same guest of that room who already purchased an Internet package. The controller module 120 in this embodiment determines whether or not it is the same guest by comparing the stored guest identifier in column 302 of the unexpired login 312 for the identified room with the current guest identifier in column 906 of the PMS database 136 for the same room. In other embodiments, the comparison is between the stored guest identifier in column 302 with the check-in time of the current guest in that room as specified in column 905 of the PMS database 136, or with a (same) combination of fields of the PMS database 136 in that room that were utilized for storing the stored guest identifier during step 208.

Continuing the example where the stored guest identifier stored at step 208 and the current guest identifier checked at step 210 correspond to loyalty program member identifiers, in the event the stored guest identifier in column 302 of the room's unexpired login record is different than the current guest identifier for the same room in column 906 of the PMS database 136, this means the room's previous guest has now checked out and a new guest has been assigned the room (e.g., "Guest room 117"). In this situation, the unrecognized user device 102 is not treated as an additional device and control returns to step 206 to redirect the unrecognized user device to the hotel's login portal and create a new login record (see previously described steps 206 and 208).

Alternatively, when the stored guest identifier in column 302 of the room's unexpired login record matches the current guest identifier for the same room in column 906 of the PMS database 136, this means the same guest who has already purchased an Internet package is still in the room. The stored guest identifier in column 302 of unexpired login record 312 for "Guest room 117" corresponds to the guest of "Guest room 117" at the time the unexpired login was created (e.g., at initial purchase time)—see previously described step 208 where the login record is created. In contrast, the current guest identifier in column 906 of the PMS database 136 for "Guest room 117" (see row 910 of FIG. 9) corresponds to the current guest of "Guest room 117" as is now specified in the PMS database 136, which may be several hours or even days after the room's login record 312 was created. When the stored guest identifier in column 302 matches the current guest identifier in column 906, the controller module 120 thereby knows the room's guest has not changed since the Internet package was initially purchased. The unrecognized guest device 102 is therefore treated as an additional guest device added onto that same guest's already purchased Internet package. Control in this situation proceeds to step 212.

At step 212, the controller module 120 retrieves the allowed number of guest devices in column 309 of the unexpired login record 312 for the identified guest area 150 ("Guest room 117" in this example). The controller module 120 further counts the total number of guest devices that are already logged in and associated with that same guest area 150 ("Guest room 117" in this example). The count may be obtained by the controller module 120 counting the number of rows of the login database 130 that have the identified guest area 150 ("Guest room 117" in this example) in column 304 and that have the same stored guest identifier in column 302 and the same allowed access duration to the hotel's HSIA service in column 306. The number of rows for "Guest room 117" having the same details in this example is a single row 312. Since, only one device has been associated with this login record, the number of allowed guest devices in column 309 of this login record 312 (e.g., "max. 3 allowed guest devices") has not yet been reached and control proceeds step 220.

Alternatively, in another example, assume the guest area 150 identified at step 202 was "Guest room 105". As shown in an exemplary unexpired login record labeled 310 of FIG. 3, there are already three unexpired guest devices logged in for "Guest room 105"; therefore, the allowed number of guest devices in column 309 for this login record 310 ("3" in this example) has been reached. Control proceeds to step 214 in such a situation.

At step 214, because allowing an additional guest device to access the hotel's HSIA service would exceed the allowable number of guest devices for that room's unexpired login record, the UI module 122 causes the unrecognized user device 102 to display an additional guest device login screen.

Figure 10:
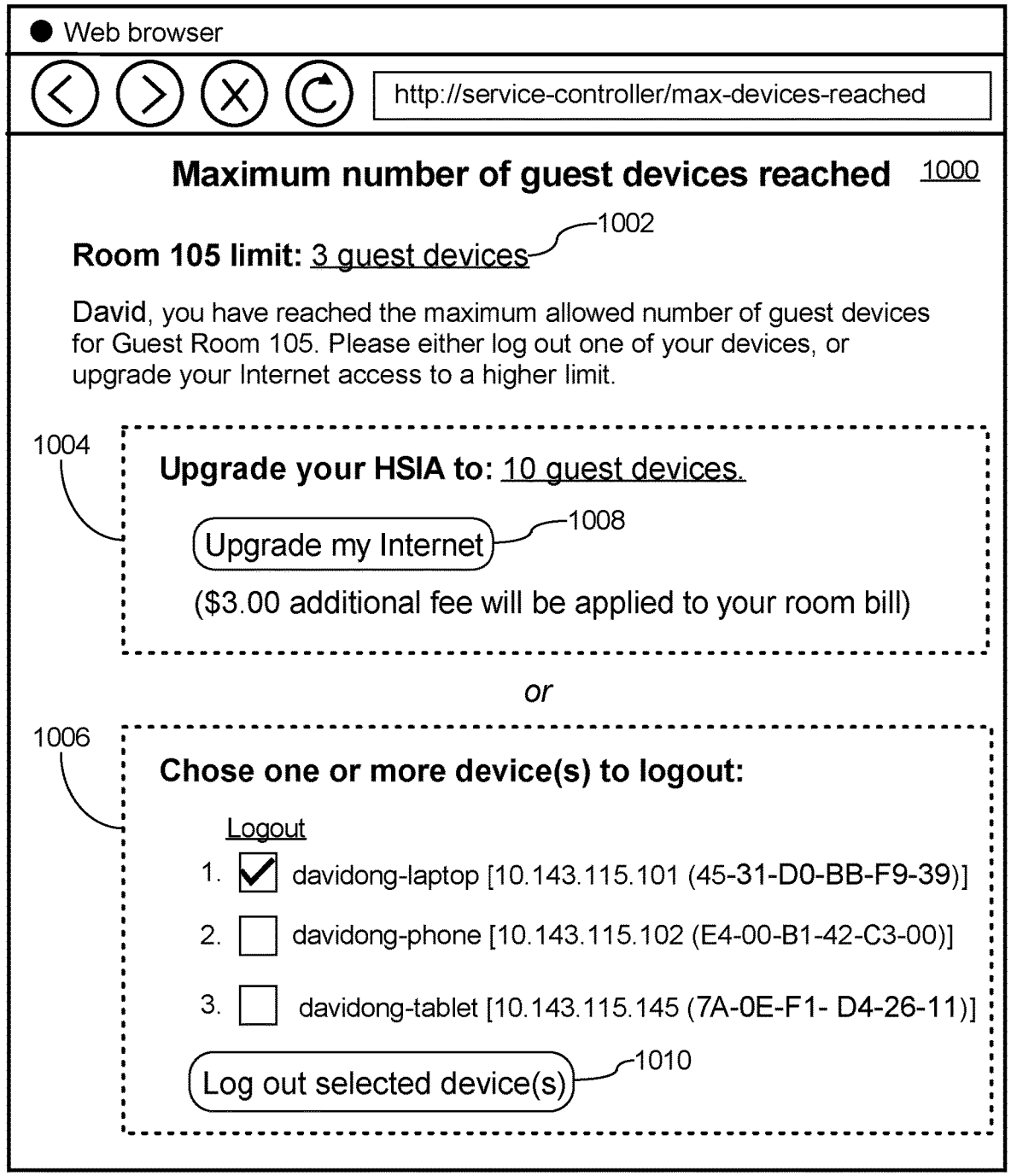
FIG. 10 illustrates an additional guest device login screen provided to a guest device by the UI module of FIG. 1 when allowing a guest device to access the network service would exceed a predetermined allowable number of guest devices.

FIG. 10 illustrates an additional guest device login screen 1000 provided to a guest device 102 by the UI module 122. Because the unrecognized user device 102 is not yet logged in, the gateway/firewall module 124 in this embodiment by default redirects the unrecognized user device 102 to the UI module 122, which can send the additional device login screen 1000 as a web page similar to how it sends the hotel's login portal. Screen 1000 may in fact be a part of the hotel's login portal in some embodiments.

The illustrated example in FIG. 10 assumes the guest is staying in "Guest room 105" and has the unexpired login record 310 in FIG. 3 indicating the guest already has three guest devices 102 logged in, which is also their allowed number of guest devices in column 309. A first section 1004 of the additional guest device login screen 1000 provides the guest the option to upgrade their Internet package to a higher allowed number of guest devices. When the guest clicks button 1008, an additional charge is automatically billed to the guest's room and the allowed number of guest devices stored in column 309 for the room's login record 310 is increased to "10" in this example. Increasing the allowed number of devices corresponds to step 216 in FIG. 2.

Another option, i.e., to log out an existing device, is presented to the guest in a second section 1006 of screen 1000. The three guest devices 102 that are already logged in are shown with selection boxes allowing the guest to choose which prior guest device(s) 102 to log out. By logging out one of the currently logged in devices 102, the user can then log in the unrecognized device 102 that they are now utilizing without increasing the room's allowed number of guest devices. Upon choosing to log out a particular device 102, e.g., the device having hostname "davidong-laptop" in FIG. 10, the rule in the firewall rule 134 clearing this device for Internet access is dynamically deleted by the controller module 120 and the row of the login database 130 corresponding to this device is deleted (or deactivated, or moved to a history archive, etc.). In this way, the prior guest device 102 that is selected for logout will no longer be able to access the Internet 108 and the unrecognized user device 102 the user is currently using can be logged in instead.

In an alternative embodiment, rather than allowing or requiring the guest to select which prior guest device 102 associated with their login record 310 to delete, the controller module 120 can automatically select the prior guest device 102 for logout. In an example, the controller module 120 automatically logs out the oldest prior guest device 102 as determined by tracking the exact time that each guest device 102 is logged in (e.g., using another column not shown in login database 130). In another example, the controller module 120 may keep track of which devices are currently connected to the hotel LAN 104 such as by pinging each logged in guest device 102. If a particular prior guest device is found to no longer be connected to the LAN 104, e.g., does not reply to one or more pings, the controller module 120 automatically selects that unconnected prior guest device 102 for logout. Logging out a prior guest device 102 corresponds to step 218 in FIG. 2, and may also be done automatically in other embodiments by the controller module 120 without requiring the unrecognized guest device 102 to display screen 1000.

At step 220, the controller module 120 logs in the unrecognized guest device 102 by adding a new row for it in the login database 130. The value of the device identifier in column 300 is the source MAC address (or IP address or other device identifier) specified in network traffic received at step 200. The remaining columns 302, 304, 306, 308 are copied from the unexpired login record for the identified guest area 150. In this way, the network service is provided to the new guest device 102 with a service entitlement set according to the service entitlement of the unexpired login. Returning again to the example where the identified guest area 150 is "Guest room 117" and the unexpired login is record 312 in FIG. 3, the unrecognized guest device will be logged in with its own MAC address in column 300 along with a stored guest ID 302 of "122-32-2345", a guest area 304 of "Room 117", an HSIA expiry 306 of "2012/08/17 00:01", a maximum bandwidth 308 of "256 kbps", and an allowed number of guest devices 309 of "3".

At step 222, the controller module 120 updates the firewall rules 134 to clear the now logged in guest device 102 for Internet access. Similar to a regular login, this can be done by adding a device-specific rule for the MAC address of the guest device 102 so that network traffic from this device is allowed to pass to the Internet 108. Later, when the expiry time in column 306 of the unexpired login 312 is reached, the controller module 120 updates the firewall rules 134 to remove the rule(s) allowing Internet access for the guest device(s) 102 associated with the expired login. In this way, the controller module 120 automatically allows the unrecognized guest device 102 to access the Internet 108 for a remaining portion of the allowed access duration of the unexpired login 312.

In an advantageous embodiment, the system 100 does not solely rely on verifying information entered by the guest at a web-based login portal in order to determine that an unrecognized guest device is actually an additional device of a guest who has already purchased an Internet package. Instead, the guest area 150 associated with the unrecognized device is identified and a stored guest identifier (e.g., column 302) in an unexpired login record for the identified guest area 150 is compared with a current guest identifier (e.g., column 906) as specified in the PMS database 136 for the identified guest area 150. Because the stored guest identifier (e.g., column 302) corresponds to the guest identifier that was stored in the PMS database 136 for the guest area 150 at the time the login record was created, if they still match then the controller module 120 knows that the unrecognized device is actually an additional device of the guest who purchased the unexpired Internet package. In this way, many problems caused by poor typists or users who enter fake or inconsistent guest information when trying to first log in a guest device and then add an additional guest device to their existing account are prevented.

In an advantageous embodiment, the system 100 supports transparent granting of access to the network service (e.g., HSIA) for an additional guest device. This is beneficial for guest devices that are not able to be logged in at the hotel's login portal. With transparent granting of HSIA, the controller module 120 automatically allows the additional guest device to access the Internet 108 for the remaining portion of the allowed access duration of the unexpired login in a manner transparent to the additional guest device. For example, the process of FIG. 2 can be started from the reception of a DHCP message or a connection request at the service controller 106. The process of FIG. 2 can proceed through the steps as previously described without further involvement of the additional guest device 102. In this way, the additional guest device 102 is not required to display a web page from a login portal of the hospitality establishment before gaining access to the network service. The guest can instead first purchase Internet access using a guest device 102 that is able to log in at the login portal, and then other guest devices 102 that cannot be logged in at the login portal can be added as additional guest devices and cleared for Internet access without requiring the guest to contact technical support.

The granting of access to the network service may be transparent while, in another embodiment, also optionally sending a welcome screen to each additional guest device 102 after it is automatically granted Internet access and logged in. The viewing of the welcome screen is optional meaning the additional device is already transparently cleared for Internet 108 access before being sent the welcome screen for display; therefore, if it is not capable or permitted to display the welcome screen for whatever reason, it can still access the Internet 108. For example, the gateway/firewall module 124 may attempt one time to redirect each new additional guest device to the IP address of the UI module 122 to display the welcome screen. As soon as the first attempt is done, the redirect rule is automatically removed for that guest device 102 and no further redirection attempts will be made by the gateway/firewall module 124. In this way, the HSIA service is both transparently activated for additional guest devices that cannot display the welcome screen, and includes the welcome screen for additional guest devices that can display the welcome screen.

In an advantageous embodiment, the network traffic received at step 200 can be a DHCP message. When the process of FIG. 2 begins at step 200 upon receiving a DHCP message containing the user device's MAC address, the HSIA service activation at step 222 automatically occurs soon after the connection of the guest device 102 to the LAN 104. Therefore, the guest is generally able to access external websites 160 on the Internet 108 immediately after connection of an additional guest device 102 to the hotel LAN 104. In the event that the additional guest device 102 requests an external website 160 before the firewall rules 134 are updated to activate the HSIA service for the additional guest device 102 and is therefore blocked, upon a subsequent retry of the connection request by the additional guest device 102, the firewall rules 134 will have been updated and the connection request will succeed. Delay to the user is thereby minimized in this embodiment by triggering the start of the additional device login process of FIG. 2 with the reception (at step 200) of an unrecognized MAC address in a DHCP message on the LAN 104.

The number of allowable guest devices for a particular unexpired login record can be configured at a Room Profile level, where the hotel administrator can turn the feature on and select the number of additional devices the room is allowed. In this embodiment, each room profile has a configuration option for the maximum number of additional devices allowed in that room or that type of room. The default is 0, which means no additional devices are allowed after the first device is logged in. Each room may have a different maximum number of allowed additional devices specified on its Room Profile. For example, a presidential suite may have an unlimited or high number such as 99 additional devices, and a basic room may have a low number such as 3 additional devices.

The allowed number of additional devices may alternatively be set at a Billing Options level rather than the Room Profile. A benefit of this embodiment is to allow the hotel to upsell the support of additional guest devices as a feature to guests. For example, the hotel could offer a "Basic" HSIA package that allows 1 additional device for $5, and an "Enhanced" HSIA package that allows 3 additional devices for $7. In Billing Options, a hotel administrator can configure the number of additional logins the billing option allows from 0 and up. A negative value such as −1 or a predetermined maximum value such as 99 may be utilized to specify "unlimited" additional devices.

In another embodiment, both Room Profile and Billing Profile settings may be utilized together. For example, each room may have a default maximum number of additional devices specified according to the room type. When the guest purchases a certain billing package, if the allowed number of additional devices specified by the billing package exceeds the room default, then the guest will receive the number specified by the billing package.

Service entitlements allocated to the guest during the login process may be automatically shared by the collection of guest devices 102 associated with the guest's login record. For example, when the guest chooses an HSIA billing package allowing a maximum bandwidth of 1 Mbps, the 1 Mbps is shared among all the guest devices utilized by the guest. I.e., the primary guest device and any additional guest devices logged in for free afterwards. Alternatively, each device logged in and associated with the room's billing record may receive the full maximum bandwidth of 1 Mbps regardless of how much data the other devices logged in for that room utilize.

In addition to HSIA as described in the above examples, other embodiments of the invention may be applied to other types of network services accessed by guest devices over the computer network 104 of a hospitality establishment 101. For example, an additional guest device may be automatically added to an unexpired login for network services such as video-on-demand (VOD) playback, pay-per-view, room control, TV control, etc.

In an exemplary embodiment, network traffic is received from a guest device on a computer network of a hospitality establishment, and a guest area of the hospitality establishment is accordingly identified. A login database is queried to find an unexpired login for the guest area, the unexpired login specifying a stored guest identifier corresponding to information retrieved from a property management system of the hospitality establishment regarding a guest of the guest area at a time when the unexpired login was created. The stored guest identifier of the unexpired login is compared with a current guest identifier of the guest area retrieved from the property management system regarding a current guest of the guest area. When the stored guest identifier matches the current guest identifier, the guest device is automatically allowed to access the network service for a remaining portion of the allowed access duration of the unexpired login.

In an exemplary embodiment, network traffic is received from a guest device on a computer network of a hospitality establishment, the network traffic including a device identifier of the guest device. It is determined, based upon the device identifier, that the guest device is not already authorized to access the network service at a time the network traffic is received, the guest device hence considered to be an unrecognized guest device. A user profile server is queried to determine a user identifier that is associated with the device identifier of the guest device. The login database is queried to find an unexpired login record of a different authorized guest device associated with the user identifier, the unexpired login record granting the different authorized guest device access to the network service for an allowed access duration. The unrecognized guest device is automatically granted access to the network service for a remaining portion of the allowed access duration of the unexpired login record of the authorized guest device. The unrecognized guest device is automatically granted access to the network service without the device identifier of the unrecognized guest device being stored in the login database prior to receiving the network traffic from the unrecognized guest device.

Although the invention has been described in connection with a preferred embodiment, it should be understood that various modifications, additions and alterations may be made to the invention by one skilled in the art without departing from the spirit and scope of the invention as defined in the appended claims. In an example, upon receiving a PMS checkout message for the guest associated with an unexpired login record, the controller module 120 may automatically expire the network access for all guest devices 102 associated with that guest's now checked out room. In another example, although the above examples have focused on deployments where guests are required to purchase access to the network service (e.g., HSIA access), it is not requirement that access to the network service be purchased. In some embodiments, the Internet package at the hotel 101 may be free and allow up to 3 (or any other number) of additional guests to be added for each room. In such a system, the techniques described herein can be beneficially utilized to automatically recognize and grant access to the additional guest devices thereby saving the user of having to re-accept the terms and conditions of the free Internet service at the hotel and any other steps and requirements that were originally done by the user when initially signing up to use the Internet service on the first guest device.

In the above description, the exemplary user indication of "guest" is utilized to refer to users as it common for customers of a hospitality establishment to be referred to as guests. However, it is not a requirement that the guests must be customers of the hospitality establishment and the term guest in this description includes other users such as current guests in the hotel, people who are attending a conference or meeting in the hotel, staff members at the hotel, or any other person or user who may need or want to access a network service over a computer network at the hospitality establishment. Future guests that have reservations, potential future guests that don't yet have reservations, and other users may also be given access to the network service on their guest devices. For example, a demonstration of the technology may be available in a hotel lobby guest area and all users would be able to utilize multiple guest devices in order to try out the system 100. Additionally, it is not necessary that the users bring their own guest devices 102. In another configuration, one or more of the guest devices 102 may be provided to the user by the hotel 101. It should also be noted that although portable devices that are easily carried are anticipated by the inventors as being particularly useful as guest devices 102, it is not a strict requirement that the guest devices 102 be easily carried. Other devices such as desktop computers that are of a more permanent nature may also act as guest devices 102 in conjunction with the invention.

Although the invention has been described as being utilized at a hotel, the invention is equally applicable to any hospitality related establishment providing a service to guest devices over a computer network including but not limited to hotels, motels, resorts, conference centers, hospitals, apartment/townhouse complexes, restaurants, coffee shops, retirement centers, cruise ships, busses, airlines, shopping centers, passenger trains, etc. The invention may also be beneficially employed in other applications outside the hospitality industry such as by corporations or any other entity wishing to allow users to utilize a network service from multiple user devices.

The various separate elements, features, and modules of the invention described above may be integrated or combined into single units. Similarly, functions of single elements, features, and modules may be separated into multiple units and modules.

The modules may be implemented as dedicated hardware modules, and the modules may also be implemented as one or more software programs executed by a general or specific purpose processor to cause the processor to operate pursuant to the software program to perform the above-described module functions. For example, the service controller 106 of FIG. 1 may be implemented by a computer server having one or more processors 118 executing a computer program loaded from a storage media such as storage device 114 to perform the above-described functions of the modules.

The flowcharts represent functionality and algorithms that may be implemented by dedicated hardware, and may also be implemented as one or more software programs executed by a general or specific purpose processor(s) to cause the processor(s) to operate pursuant to the software program to perform the flowchart steps. In this way, a tangible computer-readable medium stores computer executable instructions that when executed by a computer cause the computer to perform above-described steps of FIG. 2, FIG. 5, FIG. 8. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network. For example, the service controller 106 of FIG. 1 may be implemented by a computer having one or more processors 118 executing a computer program loaded from a hard drive located within the computer or elsewhere to perform the steps of the various flowcharts and above description. In one embodiment, the computer is a computer server connected to a network such as the Internet 108 and the computer program stored in the hard drive may be dynamically updated by an update server (not shown) coupled to the Internet 108. In addition to a dedicated physical computing device, the word "server" may also mean a service daemon on a single computer, virtual computer, or shared computer, for example.

Unless otherwise specified, features described may be implemented in hardware or software according to different design requirements. Additionally, all combinations and permutations of the above described features and embodiments may be utilized in conjunction with the invention.

What is claimed is:

1. A method of controlling access to a network service provided over a computer network of a hospitality establishment, the method comprising:
    receiving network traffic from a guest device via the computer network, the network traffic including a device identifier of the guest device;
    determining, based upon the device identifier, whether the guest device is already authorized to access the network service at a time the network traffic is received and considering the guest device to be an unrecognized guest device when the guest device is determined to not already be authorized to access the network service;
    querying a user profile server to determine a user identifier that is associated with the device identifier of the unrecognized guest device;
    querying a login database to find an unexpired login record of an authorized guest device associated with the user identifier, the unexpired login record granting the authorized guest device access to the network service for an allowed access duration, wherein a stored device identifier in the unexpired login record of the authorized guest device is different from the device identifier of the unrecognized guest device; and
    automatically granting the unrecognized guest device access to the network service for a remaining portion of the allowed access duration of the unexpired login record of the authorized guest device;
    whereby, the unrecognized guest device is automatically granted access to the network service without the device identifier of the unrecognized guest device being stored in the login database prior to receiving the network traffic from the unrecognized guest device.

2. The method of claim 1, further comprising, in response to being unable to find the unexpired login record of any authorized guest device associated with the user identifier, requiring the unrecognized guest device to successfully complete a login process at a login portal before granting the unrecognized guest device access to the network service.

3. The method of claim 1, further comprising:
    querying a property management system (PMS) of the hospitality establishment to determine whether the user identifier is associated with any current guest of the hospitality establishment; and
    automatically granting the unrecognized guest device access to the network service for the remaining portion of the allowed access duration of the unexpired login record only when the user identifier is determined to be associated with a current guest of the hospitality establishment.

4. A non-transitory processor-readable medium comprising a plurality of processor-executable instructions that when executed by one or more processors cause the one or more processors to perform steps of:
    receiving network traffic from a guest device via a computer network, the network traffic including a device identifier of the guest device;
    determining, based upon the device identifier, whether the guest device is already authorized to access the network service at a time the network traffic is received and considering the guest device to be an unrecognized guest device when the guest device is determined to not already be authorized to access the network service;
    querying a user profile server to determine a user identifier that is associated with ft the device identifier of the unrecognized guest device;
    querying a login database to find an unexpired login record of an authorized guest device associated with the user identifier, the unexpired login record granting the authorized guest device access to the network service for an allowed access duration, wherein a stored device identifier in the unexpired login record of the authorized guest device is different from the device identifier of the unrecognized guest device; and
    automatically granting the unrecognized guest device access to the network service for a remaining portion of the allowed access duration of the unexpired login record of the authorized guest device;
    whereby, the unrecognized guest device is automatically granted access to the network service without the device identifier of the unrecognized guest device being stored in the login database prior to receiving the network traffic from the unrecognized guest device.

5. An apparatus for controlling access to a network service provided over a computer network of a hospitality establishment, the apparatus comprising:
    a network interface coupled to the computer network;
    a storage device; and
    one or more processors coupled to the network interface and the storage device;
    wherein, by the one or more processors executing software instructions loaded from the storage device, the one or more processors are configured to:
        receive network traffic from a guest device via the computer network, the network traffic including a device identifier of the guest device;
        determine, based upon the device identifier, whether the guest device is already authorized to access the network service at a time the network traffic is received and consider the guest device to be an unrecognized guest device when the guest device is determined to not already be authorized to access the network service;
        query a user profile server to determine a user identifier that is associated with the device identifier of the unrecognized guest device;
        query a login database to find an unexpired login record of an authorized guest device associated with the user identifier, the unexpired login record granting the authorized guest device access to the network service for an allowed access duration, wherein a stored device identifier in the unexpired login record of the authorized guest device is different from the device identifier of the unrecognized guest device; and
        automatically grant the unrecognized guest device access to the network service for a remaining portion of the allowed access duration of the unexpired login record of the authorized guest device;

whereby, the unrecognized guest device is automatically granted access to the network service without the device identifier of the unrecognized guest device being stored in the login database prior to receiving the network traffic from the unrecognized guest device.

6. The apparatus of claim 5, wherein, in response to being unable to find the unexpired login record of any authorized guest device associated with the user identifier, the one or more processors are configured to require the unrecognized guest device to successfully complete a login process at a login portal before granting the unrecognized guest device access to the network service.

7. The apparatus of claim 5, wherein the one or more processors are further configured to:
query a property management system (PMS) of the hospitality establishment to determine whether the user identifier is associated with any current guest of the hospitality establishment; and
only automatically grant the unrecognized guest device access to the network service for the remaining portion of the allowed access duration of the unexpired login record when the user identifier is determined to be associated with a current guest of the hospitality establishment.

8. The apparatus of claim 5, wherein the one or more processors are further configured to determine a guest area of the hospitality establishment with which the user identifier is associated and query the login database to find the unexpired login record for the guest area.

9. The apparatus of claim 8, wherein the hospitality establishment is a lodging establishment, the guest area is a guest room of the lodging establishment, and the network service is Internet access.

10. The apparatus of claim 5, wherein the one or more processors are configured to automatically grant the unrecognized guest device access to the network service for the remaining portion of the allowed access duration in a manner transparent to the unrecognized guest device, whereby the unrecognized guest device is not required to display a web page from a login portal of the hospitality establishment before gaining access to the network service.

11. The apparatus of claim 5, wherein the one or more processors are further configured to:
count a total number of authorized guest devices that are associated with the unexpired login record; and
automatically grant the unrecognized guest device access to the network service for the remaining portion of the allowed access duration only when the total number of authorized guest devices has not already reached a predetermined allowable number of devices.

12. The apparatus of claim 11, wherein the predetermined allowable number of devices is specified according to billing details of the unexpired login record.

13. The apparatus of claim 11, wherein the predetermined allowable number of devices is specified according to a profile of a guest area of the hospitality establishment with which the user identifier is associated.

14. The apparatus of claim 11, wherein, when the total number of authorized guest devices has already reached the predetermined allowable number of devices, the one or more processors are configured to cause the unrecognized guest device to display a deletion screen giving an option to log out an already associated authorized guest device before allowing the unrecognized guest device to access the network service.

15. The apparatus of claim 11, wherein, when the total number of authorized guest devices has already reached the predetermined allowable number of devices, the one or more processors are configured to cause the unrecognized guest device to display a billing screen giving an option to increase the predetermined allowable number of devices for a monetary charge.

16. The apparatus of claim 5, wherein the network traffic received from the guest device is a dynamic host configuration protocol (DHCP) message automatically broadcast on the computer network by the guest device when it is connected to the computer network.

17. The apparatus of claim 5, wherein the network traffic received from the guest device is web traffic sent by the guest device to a login portal of the hospitality establishment.

18. The apparatus of claim 5, wherein the network traffic received from the guest device is a connection request sent by the guest device for a web site on the Internet received at a default gateway of the computer network.

19. The apparatus of claim 5, wherein, in response to determining that the guest device from which the network traffic is received is already authorized to access the network service at the time the network traffic is received, the one or more processors are configured to automatically grant the guest device access to the network service.

20. The apparatus of claim 5, wherein, in response to being unable to find any user identifier associated with the device identifier of the unrecognized guest device on querying the user profile server, the one or more processors are configured to require the unrecognized guest device to successfully complete a login process at a login portal before granting the unrecognized guest device access to the network service.

* * * * *